(12) United States Patent
Files et al.

(10) Patent No.: US 11,470,014 B2
(45) Date of Patent: Oct. 11, 2022

(54) SYSTEM AND METHOD OF MANAGING DATA CONNECTIONS TO A COMMUNICATION NETWORK USING TIERED DEVICES AND TELEMETRY DATA

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 18 days.

(21) Appl. No.: 16/862,562

(22) Filed: Apr. 30, 2020

(65) Prior Publication Data

US 2021/0344612 A1 Nov. 4, 2021

(51) Int. Cl.
*G06F 15/173* (2006.01)
*H04L 47/765* (2022.01)
(Continued)

(52) U.S. Cl.
CPC ....... *H04L 47/765* (2013.01); *G06Q 10/1095* (2013.01); *H04L 41/145* (2013.01);
(Continued)

(58) Field of Classification Search
CPC ..... H04L 47/765; H04L 67/12; H04L 41/147; H04L 47/20; H04L 41/145; G06N 20/00; G06Q 10/1095
See application file for complete search history.

(56) References Cited

U.S. PATENT DOCUMENTS

2011/0125509 A1* 5/2011 Lidstrom ............... G06Q 30/02
  705/1.1
2015/0200978 A1* 7/2015 Putterman ........ G06Q 10/06311
  709/204

(Continued)

FOREIGN PATENT DOCUMENTS

WO  2015/179632 A1  11/2015
WO  2019/226652 A1  11/2019

*Primary Examiner* — Padma Mundur
(74) *Attorney, Agent, or Firm* — Prol Intellectual Property Law, PLLC; H. Kenneth Prol

(57) ABSTRACT

An information handling system may include a processor; a memory; the processor to execute computer code of an evolved packet core to initiate a tiered communication network access policy by: detecting the connection of each of a plurality of endpoint devices to a communication network via one of a plurality of access points; and determining if a communication channel among a plurality of communication channels is available on the communication network for each of the endpoint devices based on a tier assigned to each of the endpoint devices; the processor to execute computer code of a telemetry data module to: receive telemetry data descriptive of the use characteristics of the endpoint devices; and execute a communication network machine learning algorithm using the telemetry data to generate a network prediction model; the processor to execute computer code of a reallocation module to: predict network resource use across the communication channels of the communication network based on the network prediction model and, with the reallocation module, reallocate endpoint devices based on the predicted network resource use and tier assigned to the endpoint devices.

20 Claims, 10 Drawing Sheets

(51) Int. Cl.
*G06Q 10/10* (2012.01)
*H04L 41/14* (2022.01)
*H04L 47/20* (2022.01)
*H04L 67/12* (2022.01)
*H04L 41/147* (2022.01)

(52) U.S. Cl.
CPC ............ *H04L 41/147* (2013.01); *H04L 47/20* (2013.01); *H04L 67/12* (2013.01)

(56) References Cited

U.S. PATENT DOCUMENTS

| | | | |
|---|---|---|---|
| 2016/0337923 A1* | 11/2016 | Xu | H04L 47/125 |
| 2019/0278928 A1 | 9/2019 | Rungta | |
| 2019/0286373 A1 | 9/2019 | Karumbunathan | |
| 2019/0356736 A1 | 11/2019 | Narayanaswamy | |
| 2020/0007460 A1 | 1/2020 | Guim Bernat | |

* cited by examiner

SYSTEM AND METHOD OF MANAGING DATA CONNECTIONS TO A COMMUNICATION NETWORK USING TIERED DEVICES AND TELEMETRY DATA

FIELD OF THE DISCLOSURE

The present disclosure generally relates to information handling systems and more specifically relates to information handling systems that facilitate wireless connectivity load balancing.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
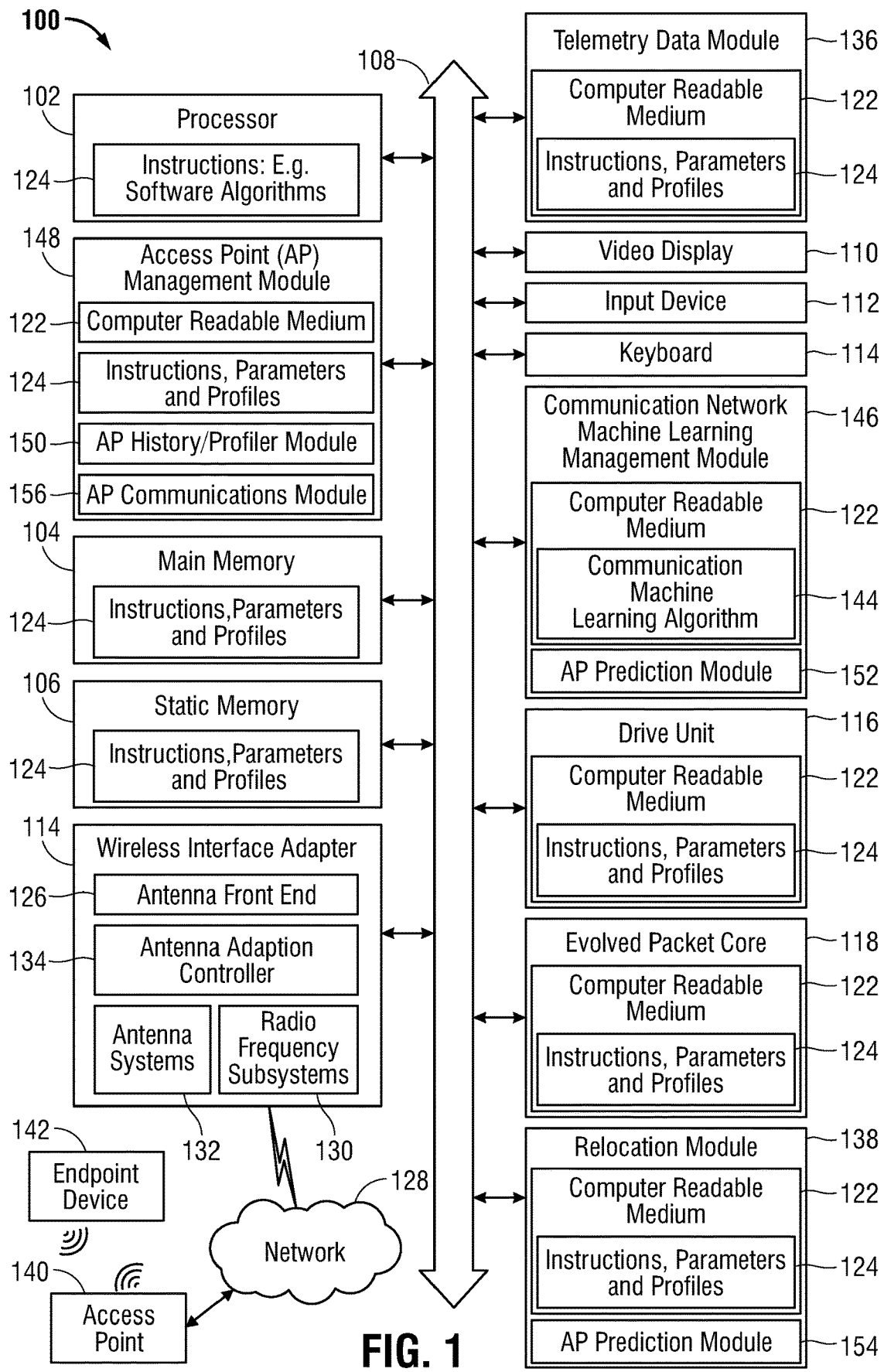
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provides for an information handling system that optimizes data traffic across a network based on, in an embodiment, a tier assigned to the user and/or metadata descriptive of use characteristics of an information handling system. In some embodiments, the communication channel the information handling system is communicatively coupled to may be based on a type of data being uploaded and downloaded across the communication network, the type of application being executed or to be executed on the information handling system, as well as a number and assigned tier of other information handlings systems accessing the communication network via any given access point. The presently described information handling system may include a processor and a memory. In this embodiment, the processor may execute computer code of an evolved packet core to initiate a tiered communication network access policy by detecting the connection of each of a plurality of endpoint devices to a communication network via one of a plurality of access points and determining if a communication channel among a plurality of communication channels is available on the communication network for each of the endpoint devices based on a tier assigned to each of the endpoint devices. The processor may also execute computer code of a telemetry data module to receive telemetry data descriptive of the use characteristics of the endpoint devices and execute a communication network machine learning algorithm using the telemetry data to generate a network prediction model. The processor may also execute computer code of a resource management module to, based on the tier assigned to the endpoint device, determine which communication channel among a plurality of communication channels to allow the endpoint device to access the communication network with and predict network resource use across the communication channels of the communication network based on the network prediction model and, with a reallocation module, reallocate endpoint devices based on the predicted network resource use.

In an embodiment, wherein the resource management module comprises an access point management module to receive the predicted network resource use that comprises a description of a predicted use of a plurality of access points associated with the communication network; and reallocate endpoint devices based on the predicted use of the plurality of access points associated with the communication network. In some embodiments, the reallocation module may receive anticipated communication network traffic descriptive of an increase in internet-of-things traffic across the communication network and, based on the tier assigned to the plurality of endpoint devices and the anticipated use characteristics of the information handling system.

In an embodiment, the predicted network resource use comprises data descriptive of time of day, operating hours of each of the endpoint devices, and historic data of the execution of applications on each of the endpoint devices. In some embodiments, the telemetry data comprises data descriptive of current data traffic sent over the communication network by the information handling system. In some embodiments, the telemetry data is descriptive of the use characteristics of the endpoint devices comprises calendar data indicating a teleconference is to be initiated by a first of the plurality of endpoint devices. In some embodiments, the telemetry data descriptive of the use characteristics of the endpoint devices comprises data descriptive of which applications are being executed by a first of the plurality of endpoint devices.

The present specification also describes a method of managing data connections to a communication network that includes with the execution of computer code associated with an evolved packet core by a processor, initiating a tiered communication network access policy by: detecting the connection of each of a plurality of endpoint devices to a communication network via one of a plurality of access points; and determining if a communication channel among a plurality of communication channels is available on the communication network for each of the endpoint devices based on a tier assigned to each of the endpoint devices; with the execution of computer code associated with a telemetry data module: receiving telemetry data descriptive of the use characteristics of the endpoint devices; and execute a machine learning algorithm using the telemetry data to generate a network prediction model; and with the execution of computer code associated with a resource management module: based on the tier assigned to the endpoint device, determining which communication channel among a plurality of communication channels to allow the endpoint device to access the communication network with; and predicting network resource use across the communication channels of the communication network based on the network prediction model and, with a reallocation module, reallocate endpoint devices based on the predicted network resource use.

The present specification also describes a communication network backend server, that includes a processor; a memory; a telemetry data module including computer code executed by the processor to maintain a telemetry database and to receive telemetry data from a plurality of endpoint devices communicatively coupled to the communication network backend server via a communication network, the telemetry data including data descriptive of the use characteristics of each of the plurality of endpoint devices; an evolved packet core including computer code executed by the processor to initiate a tiered communication network access policy by: detecting the connection of each of a plurality of endpoint devices to a communication network via a first access point of a plurality of access points; and determining if a communication channel among a plurality of communication channels is available on the communication network for each of the endpoint devices based on a tier assigned to each of the endpoint devices; a machine learning module including computer code executed by the processor to: receive the telemetry data; and execute a machine learning algorithm using the telemetry data to generate a network prediction model; an access point management module including computer code executed by the processor to: receive metadata from a first endpoint device among the plurality of endpoint devices, the metadata comprising use characteristics of the first endpoint device among the plurality of endpoint devices; pass the metadata through an access point prediction module including computer code executed by the processor to develop an access point prediction; and reallocate the first endpoint device to a second access point among the plurality of access points.

FIG. 1 illustrates an information handling system 100 according to several aspects of the present disclosure. The information handling system 100 as illustrated in FIG. 1 may be communicatively coupled to an endpoint device 142 via an access point 140. Although FIG. 1 shows a single access point 140, the endpoint device 142 may be selectively coupled to any number of access points 140 that communicatively couple the endpoint device 142 to any communication channel. In the present specification and in the appended claims, a communication channel may be any communication to the information handling system 100 or other computing resource via radio waves at a specific frequency. In the embodiments described herein, a communication channel may refer to a radio frequency channel that may form part of one of the a private LTE communication network, a public WiFi communication network, a private WiFi communication network, a 4G LTE public communication network, or a 5G millimeter-wave (mm-wave) communication network, among other types of public and private communication networks. The access point 140 may, therefore, allow the endpoint device 142 to be communicatively coupled to any type of communication network including LTE communication networks that implement 5G NR technology or citizen broadband radio service (CBRS) and a WiFi communication network, among others. In some embodiments, the information handling system 100 may be a backend server that is accessible by any endpoint device 142 over a communication network 128. The present specification contemplates that any module described herein.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server, a backend server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server, a backend server, or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. As described herein, in an embodiment, the information handling system 100 may serve as a backend server that provides computation and data storage resources as long as resources used to receive telemetry data and process that telemetry data with a communication network machine learning algorithm in order to provide communication network recommendations to any of a number of information handling systems (e.g., operating as endpoint devices) that are communicatively coupled to the backend server via one of the communication networks. In an embodiment, the recommendations may include switching from one access point 140 to another or switching from one type of communication to another. This switching from one access point 140 to another and from one communication channel to another may be based on the type of application being executed or to be executed at the endpoint device 142, historical use of any access point 140, data transmitted over any access point 140 or via any communication channel, and a tier assigned to the endpoint device 142. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server that executes an evolved packet core 118 (either public or private). In the present specification and in the appended claims, the evolved packet core 118 may be any device or devices that execute instructions, parameter, and profiles 124 so that voice and data communication requests from endpoint devices 142 may be received and routed through a communication network and to the information handling system 100 as described herein. As used in the present specification and in the appended claims, the term endpoint or endpoint device is meant to be understood as any device that accesses the communication network 128. As such, example endpoint devices 142 include internet-of-things (IoT) devices, thin client devices, laptop computing devices, desktop computing devices, among other types of computing devices.

The execution of the evolved packet core 118 may serve as a gateway for the endpoint device 142 to be communicatively coupled, for example, to a private LTE communication network, a public WiFi communication network, a private WiFi communication network, a 4G LTE public communication network, or a 5G millimeter-wave (mm-wave) communication network, among other types of public and private communication networks 128. The allocation and, in some examples, reallocation of the assignment of any given endpoint device 142 to a specific communication channel of the communication network 128 may be dependent on a number of characteristics related to the endpoint device 142, user of the endpoint device 142, the type of data being transmitted across the evolved packet core 118, the type of data anticipated to be transmitted across the evolved packet core 118, and an access point 140 accessed by the endpoint device 142, among other characteristics described herein. In an embodiment, the evolved packet core 118 may be a processing core maintained on a communication server (e.g., backend server) that implements the features described herein. In an embodiment, the evolved packet core 118 may be communicatively coupled to a server device that helps to implement the functions and processes described herein. For each of illustration, the evolved packet core 118 may be described herein as a physical processing device that is maintained on the information handling system 100 which may be a server on a communication network.

The information handling system 100 may include a memory (volatile (e.g. random-access memory, etc.), non-volatile (read-only memory, flash memory etc.) or any combination thereof), one or more processing resources, such as a central processing unit (CPU), the processor 102 illustrated in FIG. 1, a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard 114, a mouse, a video/graphic display 110, or any combination thereof. The information handling system 100 may also include one or more buses 108 operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems 100 according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the evolved packet core 118, telemetry data module 136, a reallocation module 138, communication network machine learning management module 146, AP management module 148, and drive unit 116 (volatile (e.g. random-access memory, etc.), non-volatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, three-dimensional (3D) mouse, or gesture or touch screen input), motion controller, and a keyboard 114. The information handling system 100 may also include a disk drive unit 116.

The network interface device shown as wireless interface adapter 120 may provide connectivity to one of a plurality of communication networks 128, e.g., a wide area network (WAN), a local area network (LAN), wireless local area network (WLAN), a wireless personal area network (WPAN), a wireless wide area network (WWAN), a private LTE communication network, a public WiFi communication network, a private WiFi communication network, a 4G LTE public communication network, or a 5G millimeter-wave (mm-wave) communication network, or other communication networks. Connectivity may be via wired or wireless connection. The wireless interface adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless interface adapter 120 may operate two or more wireless links. Further, connectivity of any number of endpoint devices 142 by the information handling system 100 to, for example, a communication network, may be available using any protocols related to communicatively coupling an endpoint device 142 to any communication network 128.

Wireless interface adapter 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands, used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. For embodiments herein, the number of available channels that may be available under the 5 GHz shared communication frequency band may include frequency 1 (FR1) (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands.

The wireless interface adapter 120, in an embodiment, may be used to communicatively couple the information handling system 100 to any endpoint device 142. This may be done using a plurality of radio frequency (RF) bands that include those RF bands that emit RF waves higher than 6 GHz or any other communication radio frequency. In this embodiment, the RF waves emitted by the antenna front end 126 may be controlled using the radio frequency subsystems 130. In an alternative embodiment, the information handling system 100 may form a wired communication coupling the information handling system 100 with the communication network 128 and, in this embodiment, may include other hardware and/or software that allows for the endpoint device 142 to gain access to the resources of the information handling system 100 including the telemetry data module 136, the evolved packet core 118, and the reallocation module 138.

A similar wireless interface adapter 120, in an embodiment, may connect any endpoint device 142 accessing an access point 140 (e.g., a 5G access point 140) to the information handling system 100. This may be done using a plurality of radio frequency (RF) bands that include those RF bands that emit RF waves in the sub-6 GHz FR1 frequencies or those frequencies higher than 6 GHz such as those in FR2. In an embodiment, each of the endpoint devices 142 may include a wireless interface adapter 120 that may be communicatively coupled to an array of antennas used to provide a communication channel to the information handling system 100, via an access point 140, with a communication channel found on any communication network described herein. The antennas may support a 5G wireless communication protocol so that relatively higher amounts of data may be transmitted between the endpoint devices, through the access points 140 and evolved packet core 118 of the information handling system 100 to any communication network to which the information handling system 100 is communicatively coupled.

The wireless interface adapter 120 of the information handling system 100 and/or the endpoint device 142 may further include an antenna front end system 126 which may operate to modulate and demodulate signals, set signal transmission power levels or sensitivity to signal reception, select channels or frequency bands, and conduct other functions in support of a wireless transmission from the access point 140 and to a communication network. The antenna adaptation controller 134 may execute instructions as disclosed herein for monitoring wireless link state information, endpoint device 142 configuration data, access point 140 load data, or other input data to generate channel estimation and determine antenna radiation patterns. For example, instructions or a controller may execute software or firmware applications or algorithms which utilize one or more wireless links for wireless communications via the wireless interface adapter 120 as well as other aspects or components.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a communication network 128 may communicate voice, video or data over the communication network 128. Further, the instructions 124 may be transmitted or received over the communication network 128 via the network interface device or wireless interface adapter 120.

The information handling system 100 may include a set of instructions 124 that may be executed to cause the information handling system 100 to perform any one or more of the methods or computer-based functions disclosed herein. For example, instructions 124 may execute an evolved packet core 118, a telemetry data module 136, a reallocation module 138, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, the evolved packet core 118, the telemetry data module 136, reallocation module 138, communication network machine learning management module 146, and AP management module 148 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including a look-up table used to determine or update a tier assigned to an endpoint device. The disk drive unit 116 and static memory 106 may also contain space for data storage. Further, the instructions 124 may embody one or more of the methods or logic as described herein. For example, instructions relating to the evolved packet core 118, the telemetry data module 136, the reallocation module 138 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the evolved packet core 118, telemetry data module 136, and reallocation module 138 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The evolved packet core 118, telemetry data module 136, reallocation module 138, communication network machine learning management module 146, and AP management module 148 may be stored in static memory 106, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described herein, information handling system 100 may include the evolved packet core 118 that may be operably connected to the bus 108. The computer readable medium 122 of the evolved packet core 118 may also contain space for data storage. The evolved packet core 118 may, according to the present description, perform tasks related to initiating a tiered communication network access policy. This policy may be initiated by, for example, detecting the connection of each of a plurality of endpoint devices 142 to a communication network 128 via one of a plurality of access points 140 and determining if a communication channel among a plurality of communication channels is available on the communication network for each of the endpoint devices 142 based on a tier assigned to each of the endpoint devices 142. This tier assigned to the endpoint devices 142 may be based on the type of user operating or to be operating any given endpoint device 142, data to be transmitted by the endpoint device 142, applications executed by the endpoint device 142, and a wireless network communication subscription, among other use characteristics of the endpoint device 142. Based on the tier assigned to the endpoint devices 142, the information handling system 100, via the evolved packet core 118 and other modules, may cause the endpoint devices 142 to be communicatively coupled to a communication channel of the communication network that best aligns with, at least partially, the tier assigned to the endpoint devices 142. Additionally, the evolved packet core 118 may be involved in the reallocation of the endpoint devices 142 when the reallocation module 138 indicates that any given access point 140 or communication channel has limited resources or when a higher tiered endpoint device 142 is to be allocated those resources.

In an embodiment, the evolved packet core 118 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

The information handling system 100 may also include the telemetry data module 136 that may be operably connected to the bus 108. The computer readable medium 122 of the telemetry data module 136 may also contain space for data storage. The telemetry data module 136 may, according to the present description, perform tasks related to, receiving telemetry data from a plurality of endpoint devices 142 at the information handling system 100. The telemetry data may be descriptive of the use characteristics of any of the endpoint devices 142. In an embodiment, the telemetry data may include data descriptive of a current communication channel each of the endpoint devices 142 are communicatively coupled to as well as data descriptive of current or anticipated data traffic sent over the communication network by each of the endpoint devices 142. In this embodiment, the anticipated data traffic may come from a variety of sources and, in particular, a historic description of how each of the endpoint devices 142 pass data to the information handling system 100 and receive data across any communication channel and any access point 140. The anticipated data traffic may also originate from applications being or to be executed on any of the endpoint devices 142 such as a calendaring application. In this embodiment the data from the calendar may be used to determine, for example, when a teleconferencing application is going to be used based on appointment data on the calendaring application. Because teleconferencing may greatly increase the amount of data being transmitted across any communication channel and access point 140, this data may be sent to the telemetry data module 136 and maintained in a telemetry data database for the information handling system 100 and, particularly, a communication network machine learning algorithm 144 as described herein.

In an embodiment, the telemetry data module 136 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

The information handling system 100 may also include a communication network machine learning management module 146. The communication network machine learning management module 146 may be responsible for receiving the telemetry data from the telemetry data module 136 and passing that telemetry data through a communication network machine learning algorithm 144. By passing the telemetry data through the communication network machine learning algorithm 144, a network prediction model may be generated that describes how much data is and will be transmitted across any given access point 140 and communication channel within the communication network. As described herein, the network prediction model generated by the execution of the communication network machine learning algorithm 144 may also provide data descriptive of how to communicatively couple each of the endpoint devices 142 to which of the plurality of communication channels within the communication network.

During operation, the communication network machine learning management module 146 and telemetry data module 136 may communicate with an access point (AP) management module 148. The AP management module 148 may receive and store, at an AP history/profiler module 150, data descriptive of the current and historic use of any access point 140 within the communication network. This data received and stored at the AP history/profiler module 150 may also be passed to the telemetry data module 136 to supplement any data received by the endpoint devices 142 in order to create the network prediction model via execution of the communication network machine learning algorithm 144 by the communication network machine learning management module 146. The AP management module 148 may also include an AP communication module 156 that communicates this data descriptive of the current and historic use of any access point 140 within the communication network to the telemetry data module 136 for storage and processing at the communication network machine learning management module 146.

In an embodiment, the communication network machine learning management module 146 may further include an AP prediction module 152. The AP prediction module 152 may include computer readable program code that sends predictions of access point 140 at any given time to the reallocation module 138. This AP prediction data may be retrieved from the execution of the communication network machine learning algorithm 144 by the communication network machine learning management module 146 as well as from the network prediction model generated as described herein. As described herein, the network prediction model may be used by the reallocation module 138 to reallocate or assign any of the endpoint devices 142 to a specific communication channel based on availability and bandwidth as well as the tier assigned to any given endpoint device 142. The reallocation module 138 may also, based on the prediction data from the AP prediction module 152 reallocate any given endpoint device 142 to a new access point 140 when the prediction data indicates that traffic at any given access point 140 is going to increase. Thus, the reallocation module 138, by cooperating with the communication network machine learning management module 146 and the AP management module 148, may reallocate any of the endpoint devices 142 to a new communication channel and/or a new access point 140 in order to increase the efficiency and quality of service of the communication network.

The information handling system 100 may also include the reallocation module 138 that may be operably connected to the bus 108. The computer readable medium 122 of the reallocation module 138 may also contain space for data storage. The reallocation module 138 may, according to the present description, perform tasks related to reallocating any endpoint device 142 to a different communication channel or access point 140 based on the data descriptive of the tier assigned to each endpoint device 142, any anticipated network traffic and anticipated use characteristics of the information handling system, as well as any other telemetry data described herein. As described herein and in some embodiments, the tier assigned or other characteristics related to the endpoint device 142 may allow the endpoint device 142 to be communicatively coupled to a first communication channel. The endpoint device 142 may remain on the first communication channel until a higher tiered endpoint device 142 seeks to be communicatively coupled to that communication channel or access point 140.

In an embodiment, the reallocation module 138 may include an AP selection module 154. In an embodiment, the AP selection module 154 may select the best option for any given endpoint device 642 and pass a access point 640 selection indicator to the AP communication module 610 for transmittal to the relevant access point 640 and endpoint device 642 in order to reallocate the endpoint device 642 to another access point 640 and/or communication network. In an embodiment, the AP selection module 154 may coordinate with the EPC 118 to reallocate endpoint devices 142 to certain access points 140.

In an embodiment, the reallocation module 138 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Although the present specification describes modules as separate ASICs or computer readable program packages, the present specification contemplates that any module may be packaged with any other module. In a specific embodiment, the AP management module 148 may include the AP history/profiler module 150, the AP prediction module 152, the AP selection module 154, and the AP communication module 156 into a single ASIC or computer readable program code package. The communication between the individual modules may be facilitated by any other hardware or software described herein.

During operation, the evolved packet core 118 of the information handling system 100 may be communicatively coupled to a communication network 128 either via a wired or wireless connection. In these embodiments, the communication network 128 may include a plurality of communication channels such as a public and/or private WiFi communication channel, a public and/or provide long-term evolution (LTE) communication channel, or any other citizen broadband radio service (CBRS). Each of these communication channels may include a known number of access points 140. An access point 140, according to the present specification, may be any device that allows any endpoint device 142 to be communicatively coupled to a communication channel. These access points 140 may each be selectively communicatively coupled to an endpoint device 142. The endpoint device 142 may be any type of computing device that may be communicatively coupled to a communication network via execution of the evolved packet core 118, telemetry data module 136, and reallocation module 138 as described herein. The endpoint device 142 may be any one of a mobile cell phone, a laptop computing device, a desktop computing device, a tablet device, and a personal digital assistant device, among other types of endpoint devices 142 that are attempting to establish communication with a communication network 128 such as a private LTE communication network, a public WiFi communication network, a private WiFi communication network, a 4G LTE public communication network, or a 5G millimeter-wave (mm-wave) communication network, among other types of public and private communication networks.

In an embodiment, an endpoint device 142 is communicatively coupled to the information handling system 100 via an access point 140. The access point 140 may be communicatively coupled to the information handling system 100 using any communication protocol including, but not limited to, 5G NR communication protocols, 4G LTE communication protocols, WiFi communication protocols, and citizens broadband radio service (CBRS) communication protocols. During operation, the access points 140 may communicate to the evolved packet core 118 certain characteristics regarding the endpoint device 142 or the user of the endpoint device 142. Among these may be data descriptive of a tier assigned or to be assigned to the endpoint device 142 or user of the endpoint device 142. The tiering process or assignment of a tier may be based on, in an embodiment, the user of the endpoint device 142 such as a position in the organization of a business. By way of example, a higher tier may be assigned to an endpoint device 142 that is operated by a key employee such as a chief executive officer (CEO) or critical engineering team member of a company than, for example, a lower ranked employee of that company. In this example, a guest at the company's physical site may be assigned an even lower tier when they use their endpoint devices 142 to be communicatively coupled to any of the communication networks 128 operated by the company. In an embodiment, the assignment of tier to an endpoint device 142 may be based on the type of data being or to be transmitted by the endpoint device 142. For example, where a streaming presentation is being made and the communication channels provided through the information handling system 100 are being used, the tier assigned to the endpoint device 142 may be assigned a top-tier or near top-tier assignment. In contrast, where the data being sent by the endpoint device 142 is, for example, email data, the tier assigned to the endpoint device 142 may be lower than that of the presentation-streaming endpoint device 142. In an embodiment, the assignment of tier to an endpoint device 142 may be based on the level of data to be transferred through any given communication network by the endpoint device 142. For example, where the data to be transmitted includes data associated with internet-of-things (IoT) applications like 5G, Narrow-Band IoT (NB-IoT) and machine-to-machine (M2M) communications or data associated with autonomous driving applications and processes a top-tier may be assigned to these endpoint devices 142 executing these applications. Because these types of applications may require little to no latency and little or no denial of service, these endpoint devices 142 operating these levels of data may be assigned the highest level of tier and may also be part of the decision to eliminate other communication connections between the communication networks and the other endpoint devices 142.

The data descriptive of the tier assigned to each of the endpoint devices 142 may be used to direct which endpoint devices 142 may be communicatively coupled to which communication network. As described herein, the evolved packet core 118 may selectively allow for each of the endpoint devices 142 to be communicatively coupled to one of a private LTE communication network, a public WiFi communication network, a private WiFi communication network, a 4G LTE public communication network, or a 5G millimeter-wave (mm-wave) communication network, among other types of public and private communication networks that the information handling system 100 forms a part of. During this decision process, the evolved packet core 118 may determine if a specific communication channel (e.g., communication channels associated with any of the a private LTE communication network, a public WiFi communication network, private WiFi communication network, a 4G LTE public communication network, or a 5G mm-wave communication network, among other types of public and private communication networks) is available to an endpoint device 142 that may be assigned to that specific communication channel. By way of example, where an endpoint device 142 is tiered to establish a 5G mm-wave communication on the communication network, the evolved packet core 118 may determine if such a channel is available and provide access to that communication channel even when such access may cause other lower-tiered endpoint devices to be reallocated from that communication channel to another by the reallocation module 138.

The communication network machine learning management module 146 receives the iterative telemetry data from the telemetry data module 136. The iterative telemetry data may include wireless network utilization data of the endpoint devices 142 as well as anticipated or historic iteration wireless network utilization data. The communication network machine learning management module 146 will cross reference the current time of day and date to determine how the endpoint devices 142 utilizes the wireless network at those times and date. Further telemetry data may include locations of the endpoint devices 142 detected, motion, or software applications currently operating on the endpoint devices 142 in order to feed this data into the communication network machine learning algorithm 144 of the communication network machine learning management module 146.

The telemetry data may be associated with any given endpoint device 142 and this data may be maintained in a telemetry database for consumption by the communication network machine learning algorithm 144. The communication network machine learning management module 146 will utilize the telemetry data and a resulting network prediction model created by the execution of the communication network machine learning algorithm as a baseline for use with any currently received telemetry data from any endpoint device 142. As the identified telemetry data sets are merged via the communication network machine learning algorithm 144 of the communication network machine learning management module 146, the accuracy of the multi-factor categorization becomes more accurate and potentially more specific. Training of a machine learning model for one or more predictive telemetry data sets may be conducted via multiple iterations of the communication network machine learning algorithm until a pattern is found in the current time and date, or additional factors, of potential predictive time periods of wireless utilization by the endpoint devices 142. In some aspects, the communication network machine learning algorithm may be a supervised machine learning algorithm that may be utilized to predict desired outcome of wireless communication network use or predict that one or more access points will see an increase in bandwidth use or not. The supervised machine learning algorithm may initially operate within a training period, and upon hitting a level of accuracy then be implemented to provide predictive communication network use. Other examples of communication network machine learning algorithms may be utilized as well including use of artificial neural networks, Bayesian networks, decision trees, regression analysis, among others that may be used to create the network prediction model.

The communication network machine learning management module 146 will apply a multi-factor categorization machine learning algorithm with multiple outputs to the set of telemetry data from the endpoint devices 142 of the previously-determined network prediction model. This multi-factor categorization machine learning algorithm with multiple outputs may yield conclusions for communication network performance setting of the endpoint devices 142. In other embodiments, a binary classifier may be used several times with each of the network prediction models to predict binary states such as reallocation of the endpoint devices 142 or not.

Once the communication network machine learning management module 146 applies a machine learning methodology to determine correlations of the influencing factors including time, day, date as well as the location, operating software applications, and hardware usage parameters in embodiments described herein, the evolved packet core 118 may detect changes to any of these influencing factors from the endpoint devices 142. The AP prediction module 152 or reallocation module 138 may either suggest or automatically apply changes to one or more of the endpoint devices 142 such as reallocating any given endpoint device 142 to a new access point 140 or communication channel. In some aspects, suggested predictive adjustments or notice of automatic predictive adjustments may be confirmed or declined by the user and this decision may be recorded for the predictive time and date-based telemetry data entry for a correlated, matching time and date-based pattern.

By modeling and profiling the previous historical behavior related to wireless systems utilization and in view of the various parameters, the communication network machine learning management module 146 can learn and infer in future impending predictive time periods which endpoint devices 142 may need reallocation because they are not used in the context of the pattern found in the current time and date, or additional factors. Providing a correlation between the time of day and date to network resource usage the machine learned wireless utilization time and date factor, or other factor and patterns enables a determination of historical behavior control for the plurality of endpoint devices 142 via predictive time and date, tiered endpoint device 142, and data usage-based reallocations. In one example embodiment, the communication network machine learning management module 146, in embodiments described herein, may detect the user has a Monday morning 8 am recurring meeting, perhaps in a particular conference room, that involves execution of a particular business integration dashboard application such as a teleconferencing application. Further, that user may be assigned priority based on the tier assigned to the user, the business integration application may always given priority, and/or, the bandwidth at any communication channel is low. Any of these factors may be considered when connecting the endpoint device 142 to, for example, a 5G access point available in the identified location. As a result, the communication network machine learning management module 146 may provide recommendations to disable other network communications, such as 4G LTE wireless network interface module or a Wi-Fi network interface module and initiate another network communication to facilitate the relatively higher network usage.

The evolved packet core 118 may also send endpoint tiered data to the reallocation module 138. The reallocation module 138 may receive this tiered data descriptive of the tier of each endpoint device 142 and balance a network load over each of the available communication networks based on that tier of the endpoint device 142 and the data to be or being transmitted over a specific communication channel and via a specific access point 140. In an embodiment, the reallocation module 138 may detect or be provided with data descriptive of the number of endpoint devices 142 communicatively coupled to each of the private LTE communication network, public WiFi communication network, private WiFi communication network, 4G LTE public communication network, or 5G millimeter-wave (mm-wave) communication network that are available to the endpoint devices 142. The reallocation module 138 may determine the resources used at each of the communication networks, the throughput at each communication network, response time at each communication network, among other factors in order to determine whether more or less endpoint devices 142 may be communicatively coupled to any of the communication channels of the communication network 128. In an embodiment, the various communication channels may be tiered as well such that the communication networks that offer faster speeds, higher throughput, and larger geographic coverage are tiered higher than those communication channels that are not. For example, a 5G mm-wave network may be tiered higher than a private LTE network due to the higher upload/download speeds and larger frequency spectrum of the 5G mm-wave networks than those seen on a private LTE. As such, the reallocation module 138 may execute instructions, parameters, and profiles 124 that communicatively couples the maximum number of endpoint device s142 to the 5G mm-wave network as possible without degrading network communications for any of the endpoint devices 142 coupled to the 5G mm-wave network. Where there are more endpoint devices 142 that the 5G mm-wave communication network can support, the reallocation module 138 may review the tiered data associated with each of the endpoint devices 142 as well as the telemetry data from any specific endpoint device 142 received from the evolved packet core 118 and allocate 5G mm-wave communication network to the highest tiered endpoint devices 142 while reallocating any remaining endpoint devices 142 to, for example, a private 4G LTE communication network or other network available to the endpoint devices via the evolved packet core 118 and information handling system 100.

The 5G mm-wave communication network may also manage the number endpoint devices 142 that are communicatively coupled to any given access point 140 within the communication network. In an embodiment, the reallocation module 138 may be responsible for load balance these endpoint device 142 across a plurality of access point 140 associated with any given communication channel within the communication network 128 so that any given access point 140 that can take on additional data transmission for any endpoint device 142 may be rerouted to that access point 140 in order to provide better communication among the communication network 128. The reallocation module 138 may consider the tiering data associated with each endpoint device 142, the physical proximity of each endpoint device 142 to any given access point 140, and the signal strength at each endpoint device 142 or access point 140 to reallocate the endpoint devices 142 among the plurality of access points 140.

The evolved packet core 118 and reallocation module 138 may each or cooperatively execute instructions, parameters, and profiles 124 in order to load balance the various communication networks and assign each endpoint device 142 to a specific communication network. Example pseudocode may include the following:

```

For managed networks j=1 to max(networks) Do:
   For AP(n); n=1 to max(AP) DO:
   For AP(n)T(m); m=1 to maxTiersDO:
      IF   (AP(n)T(m)connections>>AP(n-1)T(m)connec-
         tions)
         For T(m)endpoint(x); x=1 to max(T(m)endpoints)
            IF   (AP(n)RSSI(endpoint(x))<=AP(n-1)RSSI
               (endpoint(x)))
               Move endpoint(x) to AP(n-1)
```

In this embodiment, for each access point 140, the reallocation module 138 may cycle through all endpoint devices 142 and reallocate the endpoint devices 142 such that each of the access points 140 within the communication network 128 has roughly the same number of endpoint device connections per assigned tier. During operation of the information handling system 100, the reallocation module 138 may reallocate endpoint devices 142 to a different access point 140 when, for example, a signal strength connection is the same or better than an existing connection. Other factors may be taken into consideration including the transmission capabilities of any given access point 140 and the diversity of tiered endpoint devices 142, among other considerations described herein that improve the connection of the endpoint device 142 to the access point 140 and the resource allocation of the communication network 128 on a whole.

The information handling system 100 may include a network slicing module (not shown). The network slicing module may enable the multiplexing of virtualized and independent logical networks on the same physical network infrastructure of which the information handling system 100 is communicatively coupled to. This form of virtual network architecture combines principles behind software defined networking (SDN) and network functions virtualization (NFV) on a fixed network to increase flexibility. Network slicing may separate a control plane (CP) from the user plane to move the functionality of the user plane towards an edge of the network. Each network slice formed and managed by the network slicing module may have its own architecture, provisioning management and security that supports a particular purpose associated with the purpose of the formation of the network slice. Considerations such as speed, capacity, connectivity, and coverage are allocated to meet the requirements of the network slice's objectives. In examples where the connection has low latency and adequate bandwidth, the prioritization of different tasks may be performed on a software level division of the network. The network slices that occupy a single physical network may be separated such that traffic and/or security breaches from one network slice does not interfere with another network slice formed and managed by the network slicing module.

In an embodiment, each network slice formed and managed by the network slicing module may be isolated within the network and may be tailored to fulfil diverse network requirements. In an embodiment, a network slice formed and managed by the network slicing module may be tailored to operate the transmission of data related to an IoT network that is used to manage a system of interrelated computing devices, mechanical and digital machines, and other objects that are provided with unique identifiers (UIDs) and transfer data over the sliced network. In an embodiment, a network slice formed and managed by the network slicing module may be tailored to operate the transmission of data related to an autonomous driving process or processes. In this embodiment, the autonomous driving processes may send and receive data descriptive of the conveyance of a driverless car. As it may be appreciated, the data transmission during the operation of the autonomous driving processes may include a significant amount of data that, if not relayed appropriately, could result in damage to property or injury to humans during operation. As such, the network slice formed by the network slicing module and used to drive data related to an autonomous driving system may be given top-tier priority at, for example, a 5G mm-wave communication network. In an embodiment, a network slice formed and managed by the network slicing module may be tailored to operate the transmission of data related to a mobile broadband system. In this embodiment, the data transmitted at this network slice may be reallocated to a lower-tiered communication network such as a private LTE communication network.

In an embodiment, the network slicing module may cooperate with the reallocation module 138 to load balance the network connections on any given network slice. In an embodiment, for each access point 140 and the reallocation module 138 may cycle through all endpoint devices 142 so as to reallocate those endpoint devices 142 such that each access point 140 has roughly the same number and/or diversity of connections based on the network slice formed and managed by the network slicing module. In an embodiment, the network slicing module may slice the network into slices based on the connection requirements the slice is to be used for. During operation, the endpoint devices 142 may be reallocated to a new access point 140 if the signal strength is the same or better at another access point 140. Similarly, the endpoint device may be reallocated to another network slice by the network slicing module when the requirements of the endpoint device 142 do not fit the networked purpose of the slice.

Figure 2:
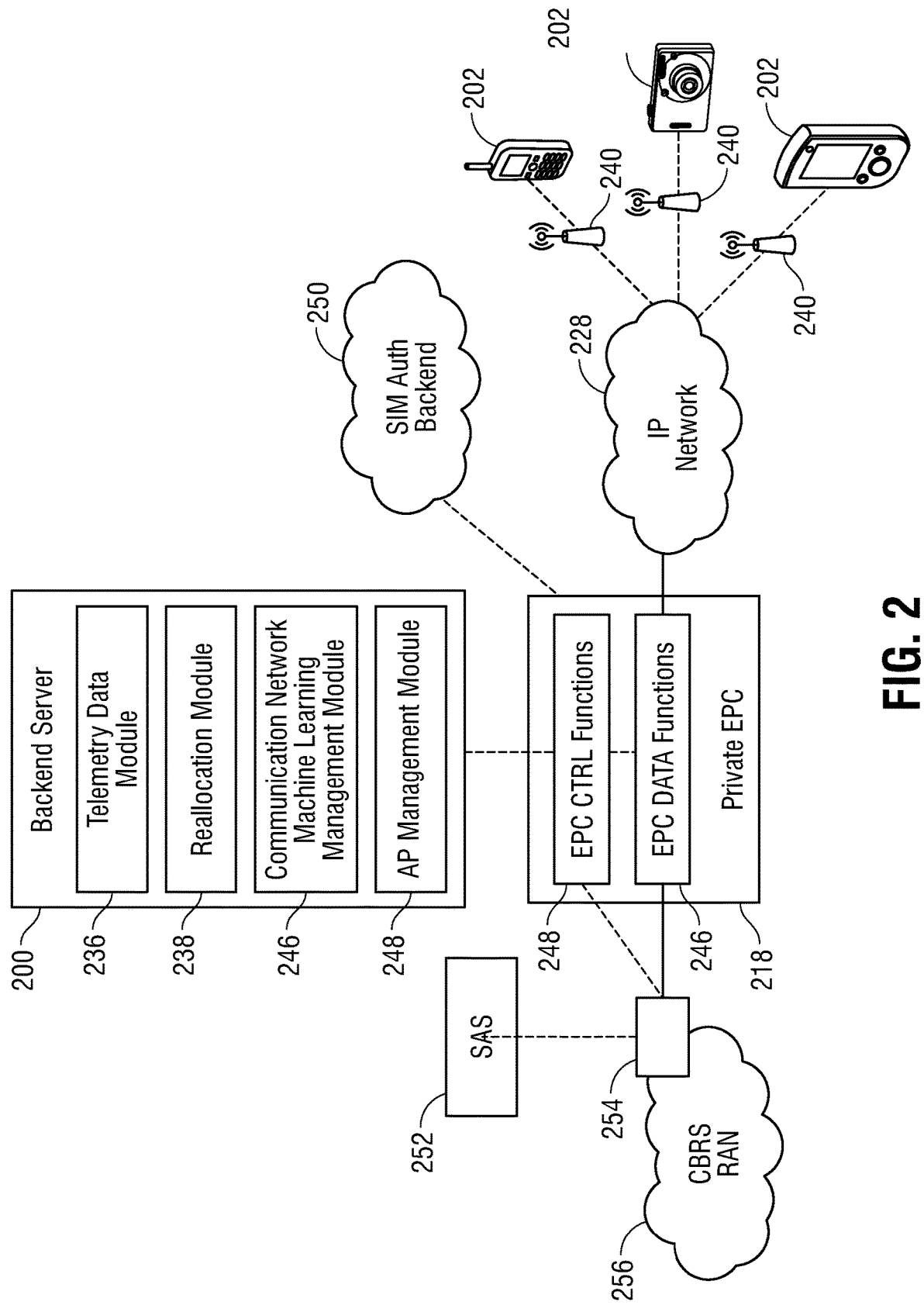
FIG. 2 is a block diagram illustrating an information handling system included within a communication network according to an embodiment of the present disclosure.

FIG. 2 is a block diagram illustrating a backend server 200 (as an information handling system) included within a communication network and operating a communication network machine learning management module according to an embodiment of the present disclosure. In this embodiment, the backend server 200 may be communicatively coupled to a private evolved packet core 218 operates with a part of the communication network machine learning management module 246 and AP management module 248 that is cooperatively used to communicatively couple a plurality of endpoint devices 202 to one of a plurality of communication networks and/or reallocate these connections as the available resources across the communication network change. The evolved packet core 218, in an embodiment, may be similar to the evolved packet core as described in connection with FIG. 1. The evolved packet core 218 in FIG. 2 may be the logical backbone for providing voice and/or data on the communication networks associated with the evolved packet core 218. In an embodiment, the evolved packet core 218 may manage 3GPP functions and routing as well as maintain 3GPP-specific database contents and extended to other wireless network systems such as WiFi, IoT protocols or the like. In an embodiment, the evolved packet core 218 may interface with any module of the backend server 200 such as the reallocation module and AP management module 238 to reallocate any number of endpoint devices 202 to be communicatively coupled to any access point 240 associated with any communication channel of the communication network.

The endpoint devices 202 may be coupled to the backend server 200 via an access point 240 and an internet protocol (IP) network 228. The IP network 228 may include the private evolved packet core 218 that executes instructions, parameter, and profiles so that voice and data communication requests from the endpoint devices 202 may be received and routed to a communication network as described herein. The execution of the evolved packet core 218 may serve as a gateway for the endpoint devices 202 to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given endpoint device 202 to a specific communication network may be dependent on a number of characteristics related to the endpoint devices 202, users of the endpoint devices 202, the type of data being transmitted across the evolved packet core 218 and access point 240, a virtual network slice accessed by the endpoint devices 202, and the access point 240 accessed through which the endpoint devices 202 communicate to the evolved packet core 218, among other characteristics described herein.

The evolved packet core 218 may include evolved packet core (EPC) control functions 248 and EPC data functions 246. The EPC control functions 248 may include those instructions, parameters, and algorithms that causes the endpoint devices 202 to be routed to a specific communication network that may include one of a private LTE communication network, a public WiFi communication network, a private WiFi communication network, a 4G LTE public communication network, or a 5G millimeter-wave (mm-wave) communication network, among other types of public and private communication networks. The EPC data functions 246 may include that data used by the evolved packet core 218 to determine the tier assigned to any specific endpoint device 202. The tier assigned to each of the endpoint devices 202 may cause the communication network machine learning management module 246 to execute its communication network machine learning algorithm to assign each of the endpoint devices 202 to a specific access point 240 and a specific communication channel. As described herein, each of the endpoint device 202 may be assigned a tier that is reflective of that endpoint devices' 202 importance and/or communication network requirements. As any given endpoint device 202 is communicatively coupled to the IP network 228 and evolved packet core 218, the evolved packet core 218 may detect, for example, a MAC address or other endpoint devices 202 identification and then look up the endpoint device 202 identification on the look-up table. Where any endpoint device 202 is not listed on the look-up table, the evolved packet core 218 may use other data to assign a tier to the endpoint devices 202. This other data may include the type of data to be transmitted by the endpoint devices 202 and the status of the user operating the endpoint devices 202, among other characteristics described herein.

The evolved packet core 218 may be communicatively coupled to a SIM authentication backend 250. The SIM authentication backend 250 may also be used to identify the mobile operator that issued a SIM card associated with the endpoint devices 202. In an embodiment where an LTE network or private LTE network is being accessed by the endpoint device 202, the SIM authentication backend 250 may monitor for any endpoint device 202 that is intended to be used on the private LTE network and confirm that these endpoint devices 202 have a SIM card or other subscriber access credentials.

The evolved packet core 218 may also include an IT management backend (not shown). The IT management backend may allow for the modification of any criteria or processes at the evolved packet core 218 as described herein. For example, the decision processes or algorithms used to direct an endpoint device 202 to a communication network may be altered using the IT management backend.

Among the plurality of communication networks, the evolved packet core 218 may be communicatively coupled to a citizen broadband radio service (CBRS) radio access network (RAN) 256. The CBRS RAN 256 may, in an example, include a 150 MHz wide broadcast band of the 3.5 GHz band. The CBRS RAN 256 may be communicatively coupled to the evolved packet core 218 via operation of a spectrum access system (SAS) 252 at a CBRS base station 254. The SAS 252 may be responsible for protecting endpoint devices 202 operating on the CBRS RAN 256 spectrums from harmful interference from the deployment of new endpoint devices 202 on the CBRS RAN 256 spectrums. During operation the CBRS base station 254 may provide coordinates (e.g., latitude, longitude, and altitude) to the SAS 252. Based on this information, the SAS 252 provides the CBRS base station 254 with a list of communication channels (e.g., frequencies) not already in use within the CBRS base station 254 spectrum. This process may be conducted similarly for any other type of communication network such as a private LTE communication network, a public WiFi communication network, a private WiFi communication network, a 4G LTE public communication network, or a 5G millimeter-wave (mm-wave) communication network, among other types of public and private communication networks.

The evolved packet core 218 may be communicatively coupled to the backend server 200 via a wired or wireless connection. In an embodiment, the backend server 200 may include the telemetry data module 236, the reallocation module 238, a communication network machine learning management module 246 executing a communication network machine learning algorithm, and an AP management module 248. As described herein, the evolved packet core 218 may be used by the telemetry data module 236 to, according the present description, perform tasks related to, receiving telemetry data from a plurality of endpoint devices 202 at the backend server 200. The evolved packet core 218 may facilitate this be initially communicatively coupling each of the endpoint devices 202 to a communication channel such as a WiFi communication channel, an LTE communication channel, a CBRS communication channel, or any other type of communication network. The telemetry data received by the telemetry data module 236 via the evolved packet core 218 may be descriptive of the use characteristics of any of the endpoint devices 202. The telemetry data may include data descriptive of a current communication channel each of the endpoint devices 202 are communicatively coupled to as well as data descriptive of current or anticipated data traffic sent over the communication network by each of the endpoint devices 202. This anticipated data traffic may come from a variety of sources and, in a particular embodiment, a historic description of how each of the endpoint devices 202 pass data to the backend server 200 and receive data across any communication channel and any access point 240. The anticipated data traffic may also originate from applications being or to be executed on any of the endpoint devices 202 such as a calendaring application. In this embodiment the data from the calendar may be used to determine, for example, when a teleconferencing application is going to be used based on appointment data on the calendaring application. Because teleconferencing may greatly increase the amount of data being transmitted across any communication channel and access point 240, this data may be sent to the telemetry data module 236 and maintained in a telemetry data database for the backend server 200 and, particularly, a communication network machine learning algorithm 244 as described herein.

In this embodiment, the communication network machine learning algorithm (not shown) of the communication network machine learning management module 246 may be a computer executable program code that generates a network prediction model that describes how much data is and will be transmitted across any given access point 240 and communication channel. The network prediction model generated by the execution of the communication network machine learning algorithm 244 may also provide data descriptive of how to communicatively couple each endpoint devices 202 to which of the plurality of communication channels within the communication network. While taking into consideration the tier assigned to each of the endpoint devices 202, this data may be presented to each endpoint device 202 so as to direct the communication of these endpoint devices 202 to a properly tiered communication channel. During operation, the private EPC 218 may initially communicatively couple each endpoint device 202 to the backend server 200 and its modules 236, 238, 246, 248. As described herein, the telemetry data module 236 may receive telemetry data from each of the endpoint devices 202. This telemetry data from the telemetry data module 236 may be passed through the communication network machine learning algorithm of the communication network machine learning management module 246 in order to develop a network prediction model that that describes how much data is and will be transmitted across any given access point 140 and communication channel within the communication network. As the use characteristics of each endpoint device 202 changes, the backend server may receive data descriptive of these use changes at the telemetry data module 236 and, with the generated network prediction model, cause the reallocation module 238 and AP management module 248 to reallocate the endpoint devices 202, when appropriate, to a new access point 240 and/or a new communication channel. This reallocation process may be conducted any number of times so that the resources across the communication network are used in a manner to better serve all or most of the endpoint devices 202.

Figure 3:
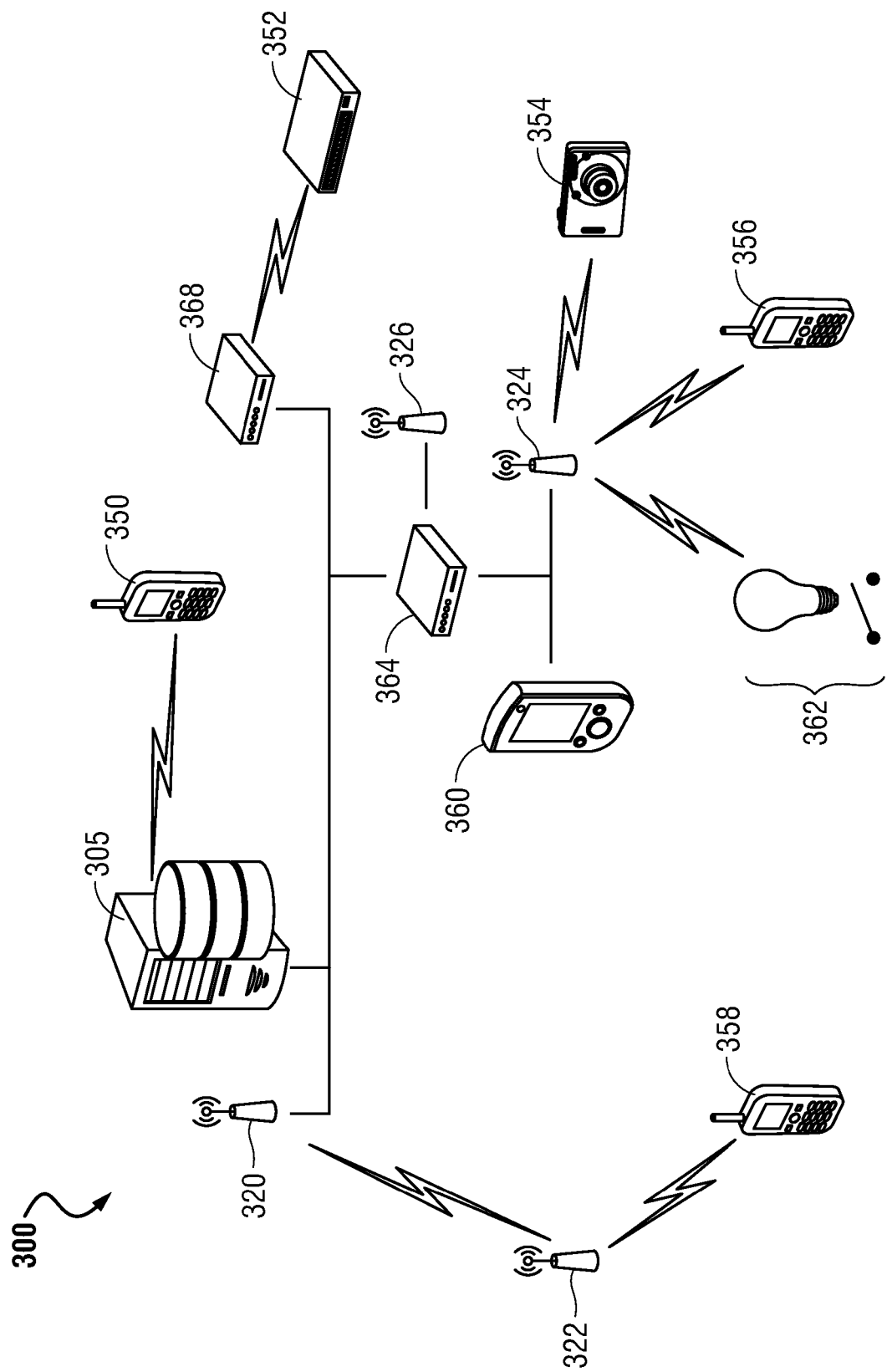
FIG. 3 is a block diagram illustrating an information handling system communicatively couplable to a communication network according to an embodiment of the present disclosure.

FIG. 3 is a block diagram illustrating an information handling system 305 included within a communication network according to an embodiment of the present disclosure. The information handling system 305 may, in the embodiment shown in FIG. 3, may be in the form of a server computing device. In an embodiment, the information handling system 305 may be a cloud server that includes stable DNS routing, data aggregation where the endpoint devices 350, 352, 354, 356, 358, 360, 362, 364 may push data thereto.

In an embodiment, the information handling system 305 may be communicatively coupled to a plurality of access points 320, 322, 324, 326. Each access point 320, 322, 324, 326 may allow for a distinct endpoint device 350, 352, 354, 356, 358, 360, 362, 364 to be communicatively coupled to the information handling system 305. In an embodiment, the access points 320, 322, 324 may facilitate the remote access of an endpoint device such as a cell phone 350, 356, 358. The remote access may transmit cellular data to the information handling system 305 using a port forwarding process. In an embodiment, the cell phone 350, 356, 358 may use a global system of mobile communications (GSM) standard, a general packet radio service (GPRS) standard, or an LTE protocol to remotely access one or a series of access points 320, 322 in order to be communicatively coupled to the information handling system 305. In some embodiments the cell phone 350, 356, 358 may use narrowband (NB) IoT radio technology to communicatively couple the cell phone 350, 356, 358 to the information handling system 305. Additionally, or alternatively, the cell phone 350, 356, 358 may be mediated by a terminal or hub with no interaction with the information handling system 305 necessary.

In an embodiment, the information handling system 305 may be communicatively coupled to an IoT device 362. The number of types of IoT devices 362 may be varied and may, according to an embodiment of the present disclosure, be directed to use a specific network slice by the information handling system 305 as described herein. Again, each of the IoT devices 362 may be communicatively coupled to the information handling system 305 via an access point 324 that may or may not be shared with other types of endpoint devices 350, 352, 354, 356, 358, 360, 362, 364.

In an embodiment, the information handling system 305 may be communicatively coupled to an endpoint device 360 via a wired connection. The wired connection may be, for example, an ethernet connection that is routed to the information handling system 305 via a hub or router 364. In any embodiment, the hub or router 364 may be communicatively coupled to an access point 326 that provides WiFi and/or other low-power radio frequency (RF) protocols. In the embodiments presented herein, such WiFi and lower-power RF protocols may be used by any of the endpoint devices 350, 352, 354, 356, 358, 360, 362, 364 to be communicatively coupled to the information handling system 305. In some embodiments, a remote location endpoint device 368 may be communicatively coupled to any number or type of local hub or router 352 so that multiple other endpoint devices 350, 352, 354, 356, 358, 360, 362, 364 may be communicatively coupled to the remote location endpoint device 368 so as to allow for communication with the information handling system 305.

In an embodiment, each of the various types of endpoint devices 350, 352, 354, 356, 358, 360, 362, 364 may be communicatively coupled to one or more access points 320, 322, 324, 326 and assigned a tier by the information handling system 305 as described herein. In addition to being assigned a tier, the endpoint devices 350, 352, 354, 356, 358, 360, 362, 364 may be placed on a network slice based on the type of data being transmitted, the type of endpoint device 350, 352, 354, 356, 358, 360, 362, 364, and the tier assigned to the endpoint device 350, 352, 354, 356, 358, 360, 362, 364, among other factors as described herein. The utilization of the network slices and tiering of the endpoint devices 350, 352, 354, 356, 358, 360, 362, 364 may balance the communication network connections while also moving endpoint devices 350, 352, 354, 356, 358, 360, 362, 364 so that the network slices are optimized as described herein. Additionally, through the use of the network slices and tiering of the endpoint devices 350, 352, 354, 356, 358, 360, 362, 364 the bandwidth across the plurality of communication networks may be balanced increasing the effectiveness of the information handling system 305 and network.

In a specific embodiment as described herein, the information handling system 305 may use certain network slicing parameters, tiering statuses of the endpoint devices 350, 352, 354, 356, 358, 360, 362, 364, physical proximity of the endpoint devices 350, 352, 354, 356, 358, 360, 362, 364 to the access points 320, 322, 324, 326, and signal strength detected to reallocate the endpoint devices 350, 352, 354, 356, 358, 360, 362, 364 to other access points 320, 322, 324, 326, communication networks, or network slices. This reallocation may be done so as to optimize an over network of network topologies increasing the functionality of the network and endpoint devices described herein.

In a specific embodiment, the information handling system 305 may, for each network topology, cycle through all endpoint device 350, 352, 354, 356, 358, 360, 362, 364 connections and reallocate those connections such that each network slice has roughly the same number of endpoint device 350, 352, 354, 356, 358, 360, 362, 364 connection and each connection is optimized based on the connection type (e.g., autonomous cars, mission critical processes, streaming processes, and IoT processes, among others).

In an alternative embodiment, the reallocation may be based on load balancing bandwidth while optimizing connection type across the network slices. Connections, in this embodiment, may be reallocated based on connection requirements (e.g., latency, reliability, bandwidth, velocity, among other factors) such that endpoint devices 350, 352, 354, 356, 358, 360, 362, 364 are only moved to a new network slice when a signal strength is the same or better via another access points 320, 322, 324, 326.

As described herein, each of the endpoint devices 350, 352, 354, 356, 358, 360, 362, 364 may provide telemetry data to a telemetry module. This data may be used to seed a communication network machine learning algorithm at the information handling system 305 in order to generate a network prediction model. The network prediction model describes how to communicatively couple each of the endpoint devices 350, 352, 354, 356, 358, 360, 362, 364 to which of the plurality of communication channels within the communication network. Other modules may be used to facilitate this reallocation of the endpoint devices 350, 352, 354, 356, 358, 360, 362, 364 to these other access points 320, 322, 324, 326 or communication channels. The network prediction model produced may be iteratively used in order to optimize the connections of each endpoint device 350, 352, 354, 356, 358, 360, 362, 364 to the communication network.

Figure 4:
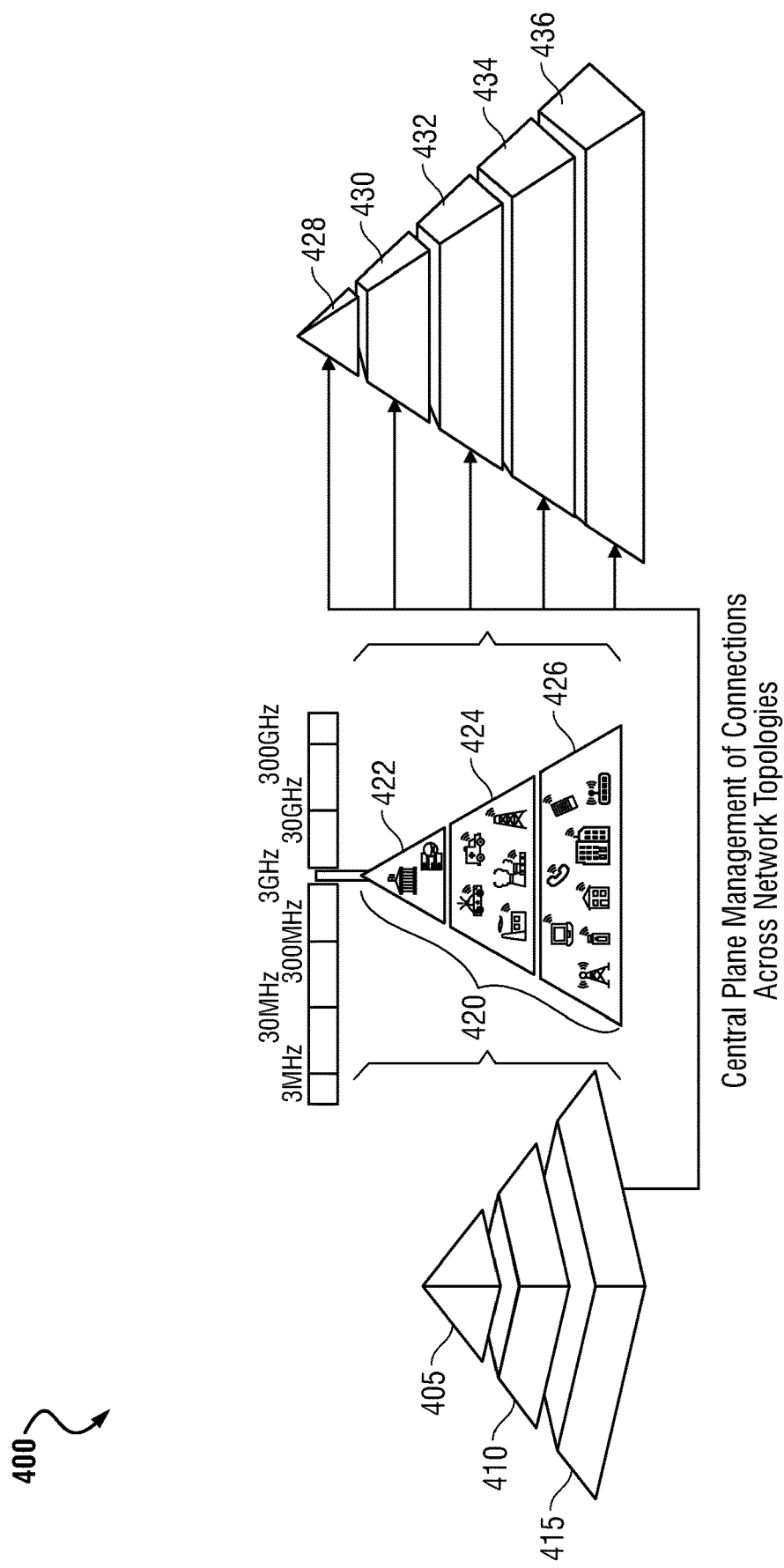
FIG. 4 is a block diagram illustrating the allocation of various tiers of users to a communication protocol according to an embodiment of the present disclosure.

FIG. 4 is a block diagram illustrating the allocation of various tiers 405, 410, 415 of users to a communication protocol according to an embodiment of the present disclosure. The tiers 405, 410, 415 presented in FIG. 4 shows a three-tiered system. However, the present specification contemplates that any number of tiers 405, 410, 415 may be used to separate some endpoint devices from others. The tiers 405, 410, 415 described in FIG. 4 may include a "mission critical" IoT tier 405, an employee tier 410, and a guest tier 415. Although FIG. 4 may describe these tiers 405, 410, 415 as including specific types of endpoint devices and/or users, the present specification contemplates that any type of delineation of tiers may be created by any particular network system to fit any particular needs of that network. As described herein, a tier assigned to any endpoint device or user may be used in conjunction with the telemetry data in order to create a network prediction model from the execution of the communication network machine learning algorithm as described herein. In an embodiment, the data descriptive of a tier assigned to any endpoint device may be received by the telemetry data module and processed using the communication network machine learning management module as described herein in order to develop this network prediction model. The application of this machine learning processes in order to reallocate endpoint devices may be especially effective where a number of these endpoint devices include IoT devices that are to be, in some examples, continuously coupled to a communication network and may dynamically adjust the amount of bandwidth used throughout a given period of time.

As described herein, the IoT tier 405 may include those interrelated endpoint devices, mechanical and digital machines, and objects that are provided with a unique identifier (UID) and include the ability to transfer data over the communication network slices described herein. In some examples, the IoT devices may operate without human interaction with those devices. These devices associated with the IoT tier 405 may work in the background and require high bandwidth throughput to continue working. Although FIG. 4 shows that IoT tier 405 is the highest tier in the list of tiers, the present specification contemplates that other types of tiers may be created and assigned a highest tier rating based on certain other network priorities.

The employee tier 410 may be a tier assigned to any communicatively coupled endpoint device that has been assigned to or used by an employee. In order to determine whether the endpoint device is assigned to or operated by an employee the information handling systems described herein may access a look-up table that includes endpoint device identifications and corresponding tier assignments of those endpoint devices. Where no endpoint device data is found on the look-up table, additional data may be used to identify the endpoint device as being associated with an employee and, therefore, qualified to be assigned to the employee tier 410. This additional data may include passwords, usernames, and other security data that would signify to the information handling system that any specific endpoint device should be assigned, at least initially, to the employee tier 410.

In the embodiment shown in FIG. 4, the lowest tier is assigned to those endpoint devices that do not qualify as IoT tier 405 devices or employee tier 410 devices. These guest endpoint devices may include those devices seeking to use the private communication networks managed by the information handling system on a temporary basis. Again, where no endpoint device identification or security information is provided, the information handling system may automatically assign these employee tier 410 endpoint devices as such.

It may be appreciated that, upon assignment of either an IoT tier 405, an employee tier 410, or a guest tier 415, the information handling system may, at least initially, assign those endpoint devices to a specific communication network. These communication networks may include, for example, a private 4G LTE communication network 430, a public WiFi communication network 436, private WiFi communication network 434, a 4G LTE public communication network, a CBRS RAN communication network 432, or a 5G mm-wave communication network 428, among other types of public and private communication networks. By way of example, a top-tiered endpoint device such as the IoT tier 405 devices may be initially assigned to the 5G mm-wave communication network 428. Additionally, the employee tier 410 endpoint devices may be assigned to any of the 5G mm-wave communication network 428, private 4G LTE communication network 430, or private WiFi communication network 434 at least initially. Similarly, the guest tier 415 endpoint devices may, at least initially, be assigned to a private WiFi communication network 434 for example.

During operation of the information handling system and the tiered system shown in FIG. 4, any type of tiered endpoint device 405, 410, 415, may be assigned to any of the communication networks if and when such channels exists and bandwidth is available at those channels. In these embodiments, the tier assigned to each tiered endpoint device 405, 410, 415 is considered along with any telemetry data from each of these tiered endpoint devices 405, 410, 415 when reallocating these tiered endpoint devices 405, 410, 415 among the communication channels on the communication networks. Again, this may be done by receiving the assigned tier and the telemetry data from each tiered endpoint device 405, 410, 415 and seeding the communication network machine learning algorithm of the communication network machine learning management module as described. In this embodiment, the communication network machine learning management module develops a network prediction model that provides data as to how best to reallocate these tiered endpoint devices 405, 410, 415 at any given time and whenever the use characteristics of each tiered endpoint device 405, 410, 415 is or is to change. In an embodiment, the execution of the reallocation module used to reallocate the tiered endpoint devices 405, 410, 415 may result in the reallocation of any tiered endpoint device 405, 410, 415 to a new communication channel, communication network, or access point in order to increase the quality of service across the communication network as a whole. In some embodiments, the present specification contemplates that, for example, a guest tier 415 endpoint device may be communicatively coupled to the 5G mm-wave communication network 428 when other higher tiered endpoint devices are not communicatively coupled to the 5G mm-wave communication network 428, additional bandwidth is available within the 5G mm-wave communication network 428, or the data bandwidth used to operate the guest tier 415 endpoint device necessitates such a connection. This reallocation of these tiered endpoint devices allows for the maximum bandwidth and throughput at the communication networks upon execution of the reallocation processes described herein.

The tiered statues of the endpoint devices may implement the SAS 420 as described herein. In a specific embodiment, the SAS 420 may direct and coordinate the connection of any tiered endpoint device based, in part or whole, on the type of device used. Again, top-tiered endpoint devices 422 may include those devices associated with IoT systems being operated over the communication networks and also those endpoint devices incumbent to the operations of, for example, a company such as a CEO or other endpoint device given precedent over any other device. Similarly, second tiered devices 424 may include those devices associated with employee operations and that are given some priority access. These may include those endpoint devices associated, for example, with autonomously driven vehicles. Still further, a lowest tier endpoint device 426 may include those devices that are deemed to be general access endpoint devices such as mobile phones of a visitor.

Figure 5:
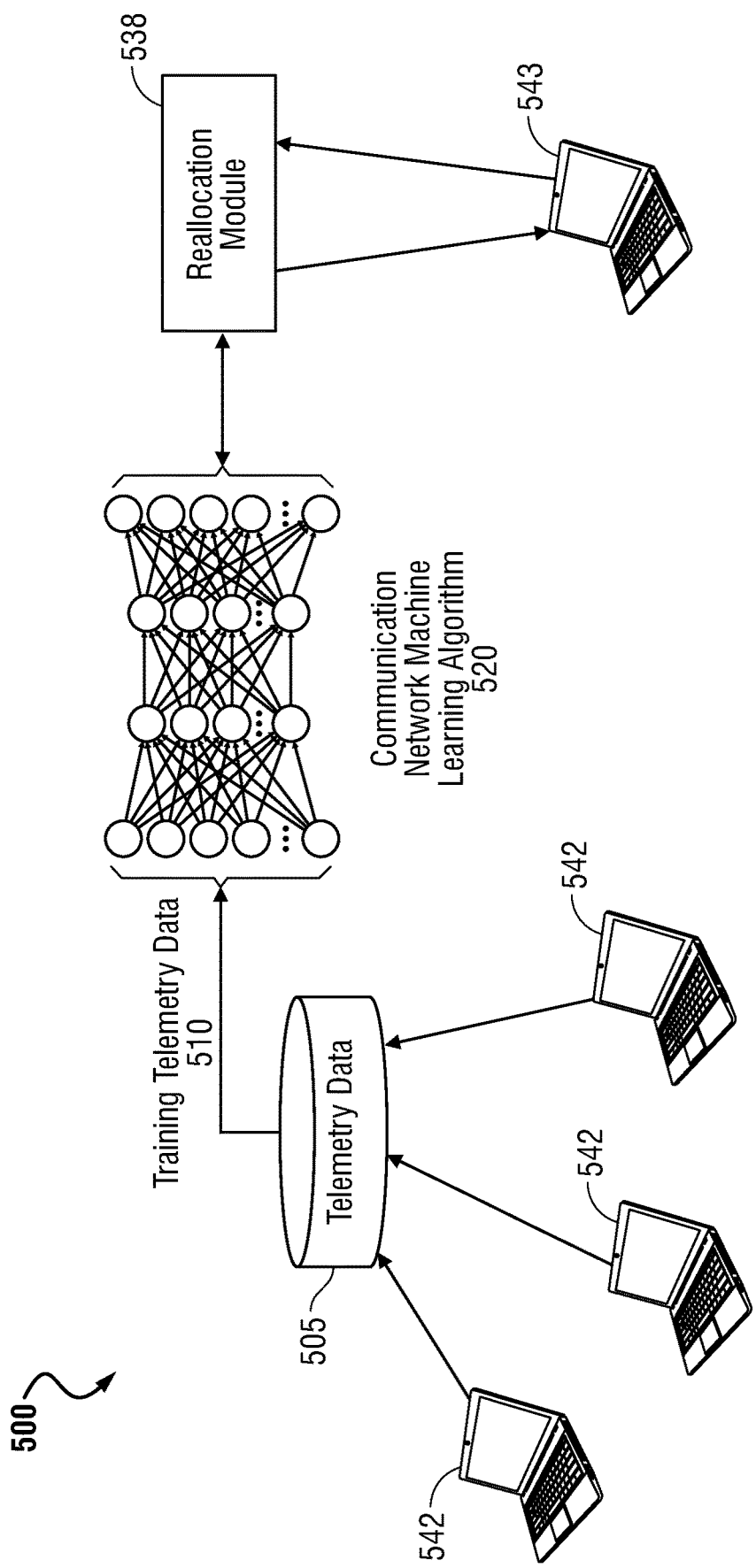
FIG. 5 is a block diagram illustrating an information handling system with a communication network machine learning management module according to an embodiment of the present disclosure.

FIG. 5 is a block diagram illustrating a network 500 operating a reallocation module 538 according to an embodiment of the present disclosure. As described herein in certain embodiments, an information handling system such as a backend server may include a telemetry data module 505 that receives telemetry data from a plurality of endpoint devices 542 and maintains that telemetry data received.

During operation of the telemetry data module 505, the telemetry data module 505 may cause a processor to execute a communication network machine learning algorithm 520. As described herein, the telemetry data module 505 may perform tasks related to, receiving telemetry data from a plurality of endpoint devices 542 and 543 at the backend server. The telemetry data may be descriptive of the use characteristics of any of the endpoint devices and 543. The telemetry data may include data descriptive of a current communication channel each of the endpoint devices 542 and 543 are communicatively coupled to as well as data descriptive of current or anticipated data traffic sent over the communication network by each of the endpoint devices 542 and 543. This anticipated data traffic may come from a variety of sources and, in particular, a historic description of how each of the endpoint devices 542 and 543 pass data to the backend server and receive data across any communication channel and any access point. The anticipated data traffic may also originate from applications being or to be executed on any of the endpoint devices 542 and 543 such as a calendaring application. In this embodiment the data from the calendaring application may be used to determine, for example, when a teleconferencing application is going to be executed at the endpoint devices 542 and 543 based on appointment data on the calendaring application. Because teleconferencing may greatly increase the amount of data being transmitted across any communication channel and access point, this data may be sent to the telemetry data module 505 and maintained in a telemetry data database for the backend server and, particularly, a communication network machine learning algorithm 520 as described herein.

In this embodiment, the communication network machine learning algorithm 520 may be a computer executable program code that generates a network prediction model that describes how much data is and will be transmitted across any given access point and communication channel. This communication network machine learning algorithm 520 may be used to, for example, predict a network communication channel, tier, and access point aspect for predicting or suggesting a network connection to the endpoint device 542 and 543 when the endpoint device 542 and 543 seeks to access wireless communications for its data operations.

In an embodiment, a communication network machine learning management module may receive the iterative telemetry data 510 from the telemetry data module 505. The iterative telemetry data 510 may include wireless network utilization data of the endpoint devices 542 and 543 as well as anticipated or historic iteration wireless network utilization data. The communication network machine learning management module will cross reference the current time of day and date to determine how the endpoint devices 542 and 543 utilizes the wireless network at those times and date. Further telemetry data 510 may include locations of the endpoint devices 542 and 543 detected, motion, or software applications currently operating on the endpoint devices 542 and 543 in order to feed this data into the communication network machine learning algorithm 520 of the communication network machine learning management module 505.

The communication network machine learning management module 505 will utilize the telemetry data and a resulting network prediction model created by the execution of the communication network machine learning algorithm 520 as a baseline for use with any currently received telemetry data from any endpoint device 542 and 543. As the identified telemetry data sets are merged via the communication network machine learning algorithm 520 of the communication network machine learning management module 505, the accuracy of the multi-factor categorization becomes more accurate and potentially more specific. Training of a machine learning model for one or more predictive telemetry data sets may be conducted via multiple iterations of the communication network machine learning algorithm until a pattern is found in the current time and date, or additional factors, of potential predictive time periods of wireless utilization by the endpoint devices 542 and 543. In some aspects, the communication network machine learning algorithm may be a supervised machine learning algorithm that may be utilized to predict desired outcome of wireless communication network use or predict that one or more access points will see an increase in bandwidth use or not. The supervised machine learning algorithm may initially operate within a training period, and upon hitting a level of accuracy then be implemented to provide predictive communication network use. Other examples of communication network machine learning algorithms may be utilized as well including use of artificial neural networks, Bayesian networks, decision trees, regression analysis, among others that may be used to create the network prediction model.

The network prediction module generated by the execution of the communication network machine learning algorithm 520 may also provide data descriptive of how to communicatively couple each of the endpoint devices 542 to which of the plurality of communication channels within the communication network. While taking into consideration the tier assigned to each of the endpoint devices 542, this data may be presented to each endpoint device 542 so as to direct the communication of these endpoint devices 542 to a properly tiered communication channel. Any endpoint device 542 and 543 may have a predicted communication link via the reallocation module 538.

In an embodiment, after receiving telemetry data from each of the endpoint devices 542, any given endpoint device 542 may subsequently send metadata about itself to a reallocation module 538. This metadata may include use characteristics of the endpoint device 543 such as specific data descriptive of how the endpoint device 543 is and is anticipating using the communication network. When the reallocation module 538 receives this metadata, the reallocation module 538 may send it to be passed through the network prediction model developed via the communication network machine learning algorithm 520 in order to generate a prediction of network use and potentially optimal communication channels and access points the endpoint device 543 could be communicatively coupled to. In an embodiment, the reallocation module 538 may then send this data to the endpoint device 543 for securing communication channel by the endpoint device 543. In an embodiment, the reallocation module 538 may engage with an AP selection module described herein in order to direct the endpoint device 543 to be communicatively coupled to a specific access point on a specific communication channel within the communication network.

Figure 6:
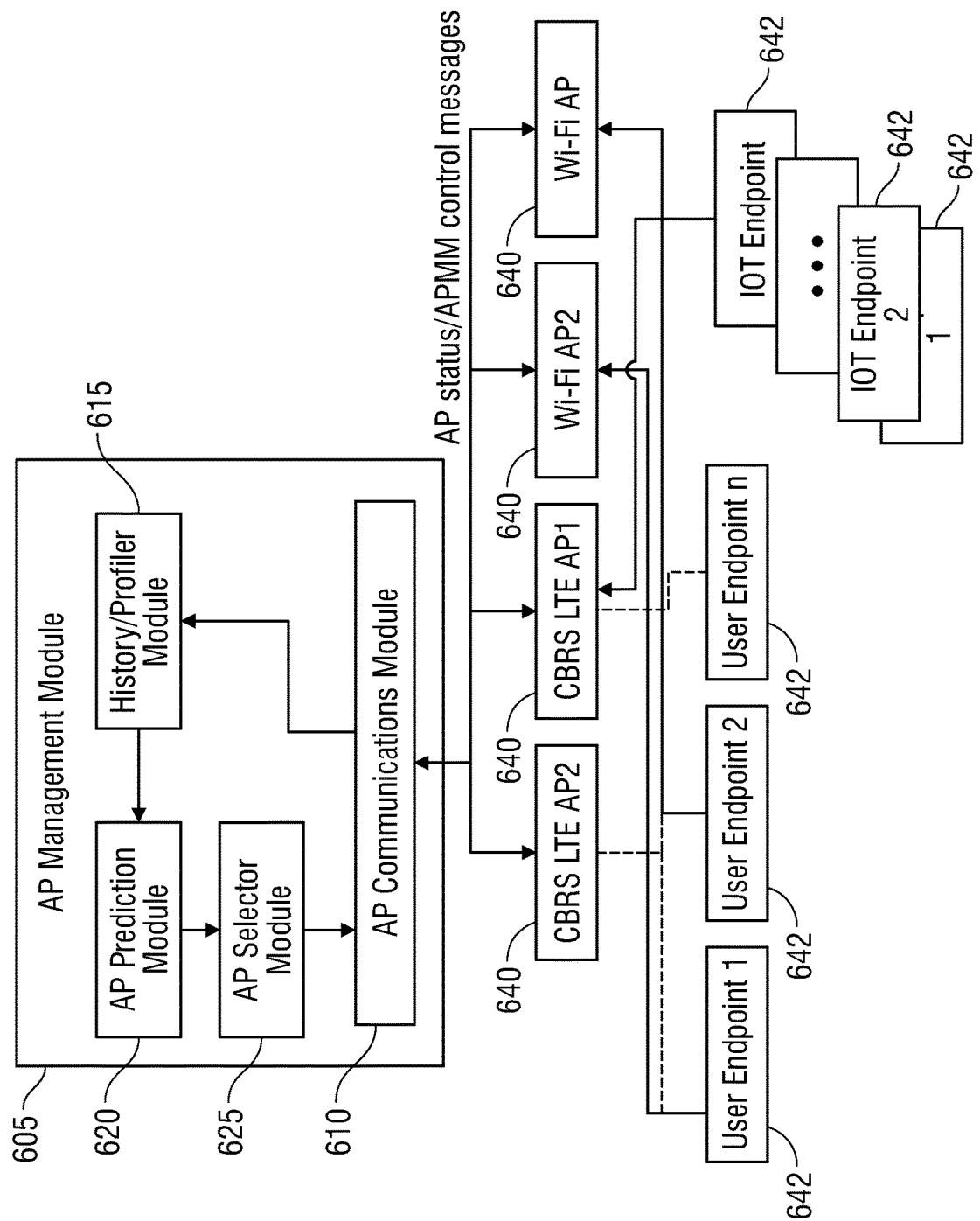
FIG. 6 is a block diagram illustrating an access point management module of an information handling system according to an embodiment of the present disclosure.

FIG. 6 is a block diagram illustrating an access point management module 605 of an information handling system according to an embodiment of the present disclosure. The AP management module 605 may be any combination of hardware or software that coordinates with the reallocation module to communicatively couple an endpoint device 642 to an access point 640 and, consequently, to a specific communication channel within the communication network. In an embodiment, the AP management module 605 may be similar to the AP management module described in connection with FIG. 1 and may coordinate the execution of all of the AP communications module 610, the history/profiler module 615, the AP prediction module 620, and AP selector module 625 as shown and described in FIG. 6. Thus, although FIG. 1 describes some of these modules 610, 615, 620, and 625, as being operated by other modules in FIG. 1, the present application contemplates that the operation of these modules 610, 615, 620, and 625 may be coordinated by any processing device or executed module without going beyond the scope of the principles described herein.

As described herein, a communication network machine learning algorithm is used within, for example, a software defined network (SDN) to provide recommendations as to which access point 640 each endpoint device 642 is to be communicatively coupled to. The AP management module 605 may coordinate the selection of which access point 640 each endpoint device 642 is coupled to based on those recommendations generated from the communication network machine learning management module of an AP prediction module 620. Again, these recommendations are generated through the receipt of telemetry data from any of a plurality of endpoint devices 642 and training of a communication network machine learning algorithm to get a network prediction model describing communication channel, tier, and access point 640 recommendations for each of the endpoint devices 642. In an embodiment, the AP management module 605 may provide these recommendations by collecting status reports from each of the access points 640 within the communication network including WiFi APs and CBRS/LTE APs, among others. These status reports may include the time of day, day of the week, loading level of each access point 640, a capacity of each access point 640, the type of data traffic to be and currently handled by each access point 640 (e.g., streaming, browsing, downloading, among others), and the type of endpoint device 642 accessing or to access each access point 640 (e.g., IoT device, user endpoint computing device, among others) connected to the access point 640. This data may be received at the history/profiler module 615 and telemetry module described herein. In an embodiment, the history/profiler module 615 may be included with the telemetry module described in connection with FIG. 1.

Because of the implementation of the communication network machine learning algorithm described herein, the AP management module 605 may be in a learning mode over a period of days, weeks, or months, depending on the type of communication network machine learning algorithm used by the information handling system. This process executed by the communication network machine learning algorithm creates an amount of data that builds profiles of the communication network in order to understand the flow of data during any hour, day, and week for example.

The AP management module 605 may transition to an operation mode where, based on the learned historic attributes of any given endpoint device 642 and access point 640, it anticipates the type of traffic at any given time and reallocates (e.g., via execution of the reallocation module) the endpoint devices 642 among the access points 640 to optimize the communication network. As described herein, the learned historic attributes of any given endpoint device 642 and access point 640 are based on a network prediction model generated via the execution of the communication network machine learning algorithm of the communication network machine learning management module as described in connection with FIG. 1. This rearrangement of priorities among the endpoint devices 642, access points 640, and, consequently, the communication channels allows for the optimization of throughput within the communication network thereby increasing the efficiency of the endpoint devices 642 and communication network.

During operation, the AP management module 605 may receive the AP status information at the AP communication module 610. The AP communication module 610 may send the status information to the history/profiler module 615 that compiles the status information received by each access point 640 and executes the communication network machine learning algorithm as described herein. In an embodiment, the communication network machine learning algorithm may be executed by an independent communication network machine learning management module as described in connection with FIG. 1. The generated network prediction model may then be sent to the AP prediction module 620 to sift through and, in an embodiment, rank the potential access points 640 and/or communication channels each of the endpoint devices 642 may be communicatively coupled to based on the use characteristics of the endpoint devices 642 and the tier assigned to them. The AP selector module 625 may then select the best option for any given endpoint device 642 and pass an access point 640 selection indicator to the AP communication module 610 for transmittal to the relevant access point 640 and endpoint device 642 in order to reallocate the endpoint device 642 to another access point 640 and/or communication network.

Figure 7:
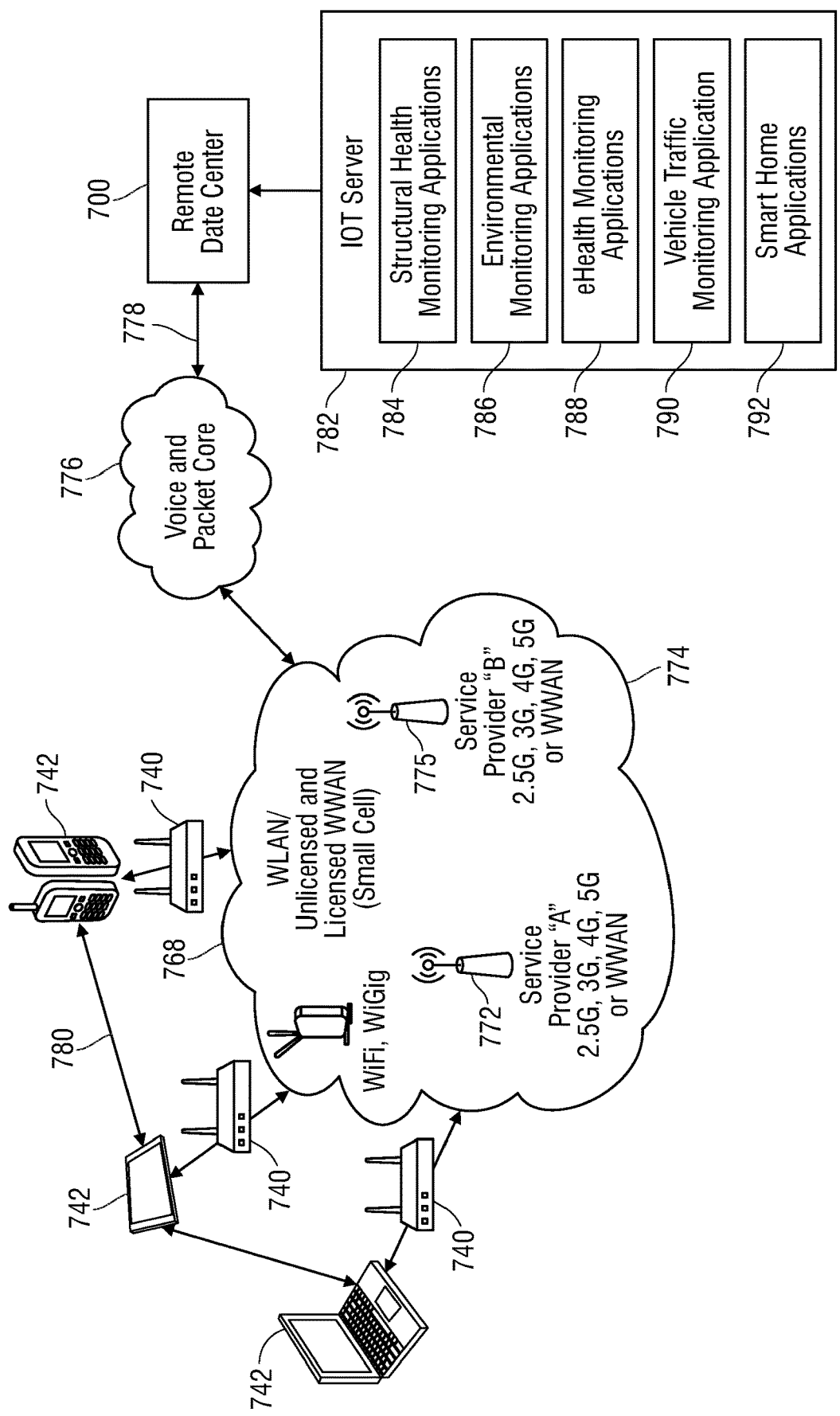
FIG. 7 is a block diagram illustrating an information handling system operating various classes of internet-of-things applications and receiving telemetry data therefrom included within a communication network according to an embodiment of the present disclosure.

FIG. 7 is a block diagram illustrating an information handling system indicated as a remote data center 700 included within a communication network according to an embodiment of the present disclosure. FIG. 7 illustrates a macro- and micro-communication network that may include a plurality of individual communication networks that communicatively couples one or more endpoint devices 742 such as the endpoint device described in connection with FIG. 1 to one of these communication networks.

In a particular embodiment, network includes networked mobile endpoint devices 742, 5G wireless access points, and multiple wireless connection link options. A variety of additional computing resources of communication network may include client mobile information handling systems, data processing servers, network storage devices, local and wide area networks, or other resources as needed or desired. As partially depicted, endpoint devices 742 may be a laptop computer, tablet computer, 360-degree convertible systems, wearable computing devices, a smart phone device or other computing devices. These endpoint devices 742, may access a wireless local network 768, or they may access a macro-cellular network 774 via the access points 740. As described herein, the access points 740 may include Wi-Fi-enabled access points, private and public long-term evolution (LTE)-enabled access points, and 5G new radio (NR)-enabled access points and may include a plurality of each to allow for the endpoint devices 742 to communicate with the communication networks (e.g., a Wi-Fi communication network, a public LTE communication network, and a private LTE communication network, among others). Although FIG. 7 illustrates three access points 740, the present specification contemplates that the number of access points 740 may be more or less than three in order to form a multi-channel network that includes a Wi-Fi network, a 5G network, and a public and private LTE network, among others. In an example, the wireless local network may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network may be connected by wireline or Ethernet connections to a wider external network. For example, wireless 5G NR-enabled or other local wireless access points 740 may be connected to a wireless network controller and an Ethernet switch. Wireless communications across wireless local network may be via standard protocols such as IEEE 802.11 Wi-Fi, IEEE 802.11ad WiGig, IEEE 802.15 WPAN, or 5G small cell WWAN communications such as gNodeB or eNodeB, IEEE 802.11, IEEE 1914/1904, IEEE P2413/1471/42010, APs 315,325, 335 implementing 802.11b, 802.11a, 802.11g, 802.11n, 802.11 ac, and 802.11 ax IEEE standards, or similar wireless network protocols developed for 5G, LTE, and Wi-Fi communications.

Alternatively, other available wireless links within network may include macro-cellular network 774 connections via one or more service providers 772 and 775. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 768 and macro-cellular network 774 may include a variety of licensed, unlicensed or shared communication frequency bands as well as a variety of wireless protocol technologies ranging from those operating in macrocells, small cells, picocells, or femtocells.

In some embodiments according to the present disclosure, a networked endpoint device 742 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 350 access points for Wi-Fi or WiGig as well as small cell WWAN connectivity may be available in emerging 5G technology. This may create situations where a plurality of antenna systems are operating on a mobile endpoint device 742 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The voice and packet core network 776 may contain externally accessible computing resources and connect to a remote data center 700. The voice and packet core network 776 may contain multiple intermediate web servers or other locations with accessible data (not shown). The voice and packet core network 776 may also connect to other wireless networks similar to 768 and 774 and additional mobile endpoint devices 742 or similar connected to those additional wireless networks. Connection 778 between the wireless network 768 or 774 and remote data center 700 or connection to other additional wireless networks may be via Ethernet or another similar connection to the world-wide-web, a WAN, a LAN, or other network structure. Such a connection 778 may be made via an access point/Ethernet switch to the external network and be a backhaul connection. The access points 740 may be connected to one or more wireless access points before connecting directly to an endpoint device 742 or may connect directly to one or more endpoint devices 742. Alternatively, mobile endpoint devices 742 may connect to the external network via base station locations at service providers such as 772 and 775. These service provider locations may be network connected via backhaul connectivity through the voice and packet core network 776.

Remote data center 700 may include web servers or resources within a cloud environment that operate via the voice and packet core 776 or other wider internet connectivity. For example, remote data center 700 may include additional information handling systems, data processing servers, network storage devices, local and wide area networks, or other resources as needed or desired. Having such remote capabilities may permit fewer resources to be maintained at the endpoint devices 742 allowing streamlining and efficiency within those devices. In an example where the endpoint devices 742 include streaming applications or other high data throughput application, those processing resources at the remote data centers may supplement the high volume of processing used to provide those processes described herein. Similarly, remote data center permits fewer resources to be maintained in other parts of network. In some embodiments, the remote data center 700 may be a backend server similar to that described in connection with FIG. 2. In this embodiment, the remote data center 700 may include any of an evolved packet core, a telemetry data module, a communication network machine learning management module, a reallocation module, and an AP management module similar to that described in connection with FIG. 6.

Although access points 740 are shown communicatively coupling wireless adapters of endpoint devices 742 to wireless networks 768 or 774, a variety of wireless links are contemplated. Wireless communication may link through a wireless access point (Wi-Fi or WiGig), through unlicensed WWAN small cell base stations such as in network 768 or through a service provider tower such as that shown with service provider A 772 or service provider B 775 and in network 774. In other aspects, endpoint devices 742 may communicate intra-device via 780 when one or more of the endpoint devices 742 are set to act as, for example, a 5G access point or even potentially a WWAN connection via small cell communication on licensed or unlicensed WWAN connections. Concurrent wireless links to endpoint devices 742 may be connected via any access points including other mobile information handling systems.

In another embodiment, a remote data center 700 may further include an IoT server 782 that maintains and directs the operations of those endpoint devices 742 that would be considered an IoT device. As descried herein, the communication network machine learning algorithm may receive data from a plurality of endpoint devices 742 that may be considered an IoT device and therefore may transmit IoT data across the communication network. The network prediction model created via operation of the communication network machine learning algorithm that describes which communication channels and access points each of the IoT endpoint devices 742 may be coupled to. When relatively heavy IoT traffic is predicted via the execution of the communication network machine learning algorithm or a maximum number of connections to a give network or access points 740 is anticipated the remote data center 700 may reallocate some endpoint devices 742 to a relatively less trafficked communication channel and/or access point 740. This allows for real-time reallocation of each of the endpoint devices 742 based on the network resources available at any given time and the resource requirements for each endpoint device 742. For example, where past telemetry data collections have shown that at 1:00 p.m. 300 to 500 IoT devices are expected to use a private LTE/CBRS communication channel to provide updates, the IoT server 782 may move existing private LTE/CBRS connections onto, for example, a WiFi communication network via WiFi access points 740, in order to free up the communication channels and bandwidths for those anticipated IoT data communication surge. In a similar example, where it is anticipated that any given endpoint device 742 is going to engage in a teleconferencing call (e.g., via information from a calendaring application or historical data received from the endpoint device 742), the IoT server 782 and remote data center 700 may move the endpoint device 742 from a WiFi communication channel and endpoint device 742 to a private LTE communication channel and endpoint device 742 before the teleconferencing call begins with the understanding that such a connection will use increase bandwidth and require less latency.

The IoT server 782 may specifically monitor for any IoT applications being executed. These IoT applications may include structural health monitoring applications 784, environmental monitoring applications 786, eHealth monitoring applications 788, vehicle traffic monitoring applications 790, and smart home applications 792. Among each of these different types of applications, the time of day, day of the week, and week within the year may indicate, via the communication network machine learning algorithm, when the communication network may experience increased bandwidth use on any give communication channel based on the tier associated with any give IoT endpoint device 742.

Figure 8:
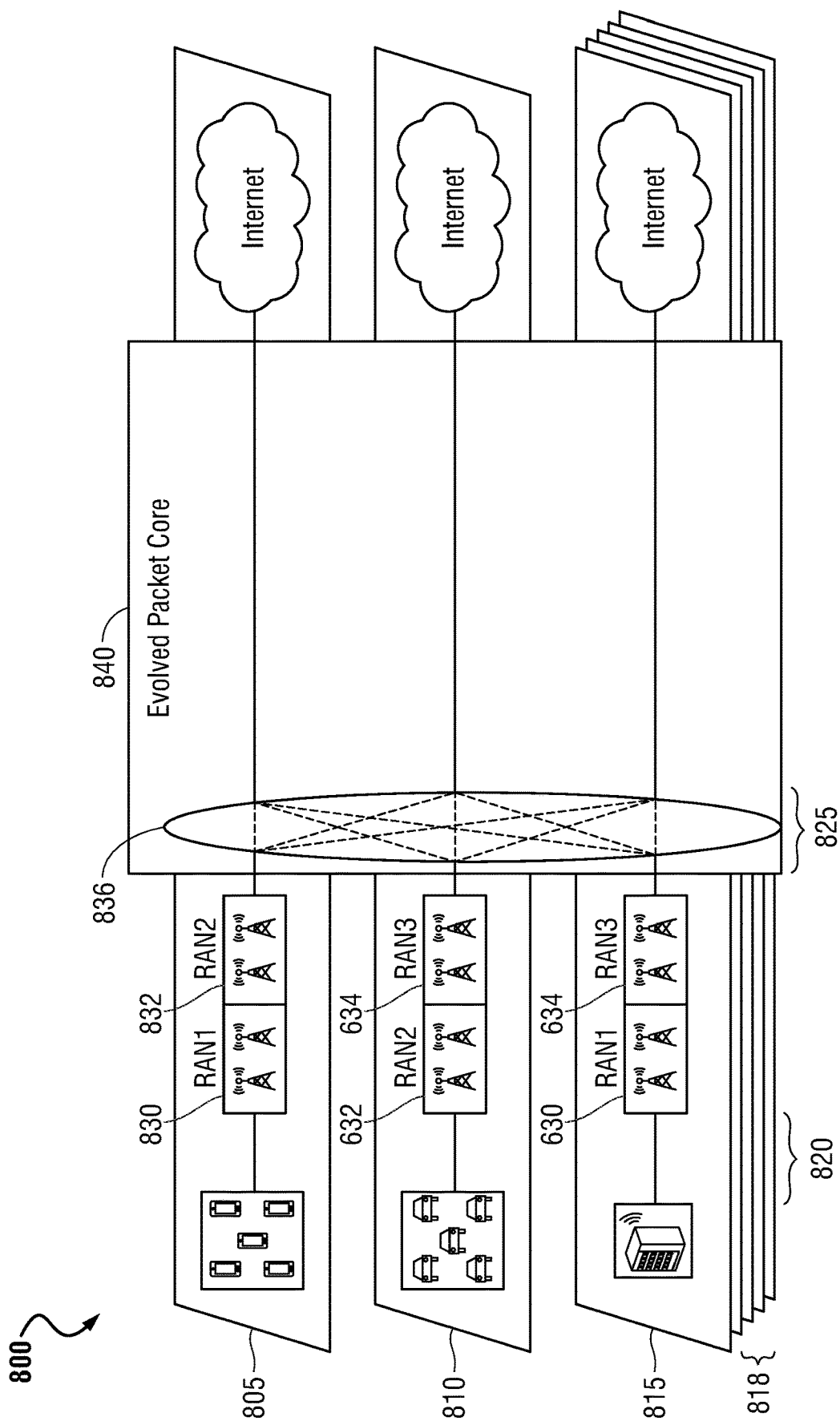
FIG. 8 is a block diagram of an endpoint packet core within a sliced network according to an embodiment of the present disclosure.

FIG. 8 is a block diagram of an evolved packet core 840 within a sliced network 800 according to an embodiment of the present disclosure. The evolved packet core 840 described here may be similar to that described in connection with FIGS. 1 and 2. In this embodiment, the evolved packet core 840 may be communicatively coupled to any of a telemetry data module, a communication network machine learning management module, a reallocation module, and an AP management module similar to that described in connection with FIG. 6. As described herein, the evolved packet core 840 may be the logical backbone for providing voice and/or data on the communication networks associated with the evolved packet core 840. In an embodiment, the evolved packet core 840 may manage 3GPP functions and routing as well as maintain 3GPP-specific database contents and extended to other wireless network systems such as WiFi, IoT protocols or the like. As described herein, the evolved packet core 840 may receive instructions from any of the reallocation module or AP management module to reallocate any number of endpoint devices to be communicatively coupled to any access point associated with any communication channel of the communication network per the network prediction model generated via execution of the communication network machine learning algorithm as described herein.

As described herein, the sliced network 800 may be sliced using a network slicing module. The network slicing module may implement one or more of a vertical network slicing or a horizontal network slicing process. These two different processes may be implemented to, respectively, allow for resource sharing between different services and applications to enhance quality of service (QoS) or allow for resource sharing among different network nodes to enhance the capabilities of less capable network nodes. In either embodiment, each network slice 805, 810, 815 can be optimized to provide the required resources and QoS to meet the diverse set of requirements for each service. By way of example, a first network slice 805 may be relegated to a mobile broadband slice. In this embodiment, the first network slice 805 may virtually separate those processes associated with the mobile broadband processes to optimize the operational processes so that these processes may be made more streamlined. Similarly, a second network slice 810 may be virtually separated to include those mission critical autonomous driving operations associated with self-driving vehicles. The autonomous driving operations may include large amounts of data transmissions that allow a vehicle to drive with no human interaction. The formation of this second network slice 810, therefore, allows the sliced network 800 to have high throughput, high bandwidth, and low latency resources available to conduct these operations without damage to property or harm to humans. Additionally, the sliced network 800 may include a third network slice 815 that is associated with operations related to IoT devices and their operations. In this example, the third network slice 815 may optimize those processes associated with the operation of those IoT devices that may, for example, require low latency.

In an embodiment, any number of radio access networks 830, 832, 834 may be used to communicatively couple each of the endpoint devices to the evolved packet core 840 via a fronthaul 820 portion of the communication network architecture. As described herein, the evolved packet core 840 may be any device or devices that execute instructions, parameter, and profiles so that voice and data communication requests from the endpoint devices may be received and routed to a communication network as described herein. The execution of the evolved packet core 840 may serve as a gateway for the endpoint devices to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given endpoint device to a specific communication network may be dependent on a number of characteristics related to the endpoint device, user of the endpoint device, the type of data being transmitted across the evolved packet core 840, a virtual network slice accessed by the endpoint device, and the access point (AP) accessed through which the endpoint device communicates to the evolved packet core 840, among other characteristics described herein. In an embodiment, the sliced network 800 may include a backhaul or any other portion of the communications network that includes intermediate links between the evolved packet core 840 and the radio access networks 830, 832, 834.

Again, the evolved packet core 840 may execute a communication network machine learning algorithm in order to provide communication network recommendations to any of a number of information handling systems (e.g., operating as endpoint devices) that are communicatively coupled to the backend server via one of the communication networks. In an embodiment, the recommendations may include switching from one access point to another or switching from one type of communication to another. This switching from one access point to another and from one communication channel to another may be based on the type of application being executed or to be executed at the endpoint device, historical use of any access point, data transmitted over any access point or via any communication channel, and a tier assigned to the endpoint device. During this reallocation of the endpoint devices, the type of network slice may also be taken into consideration in deciding which communication channel, access point, and network slice to reallocate any given endpoint device to. In these embodiments, the telemetry data module described herein, may receive data descriptive of the type of endpoint device it is (e.g., IoT device, autonomous driving endpoint device, mobile device, etc.) and use that data to create the network prediction model via passing this data, telemetry data, and access point data into the communication network machine learning algorithm of the communication network machine learning management module.

Figure 9:
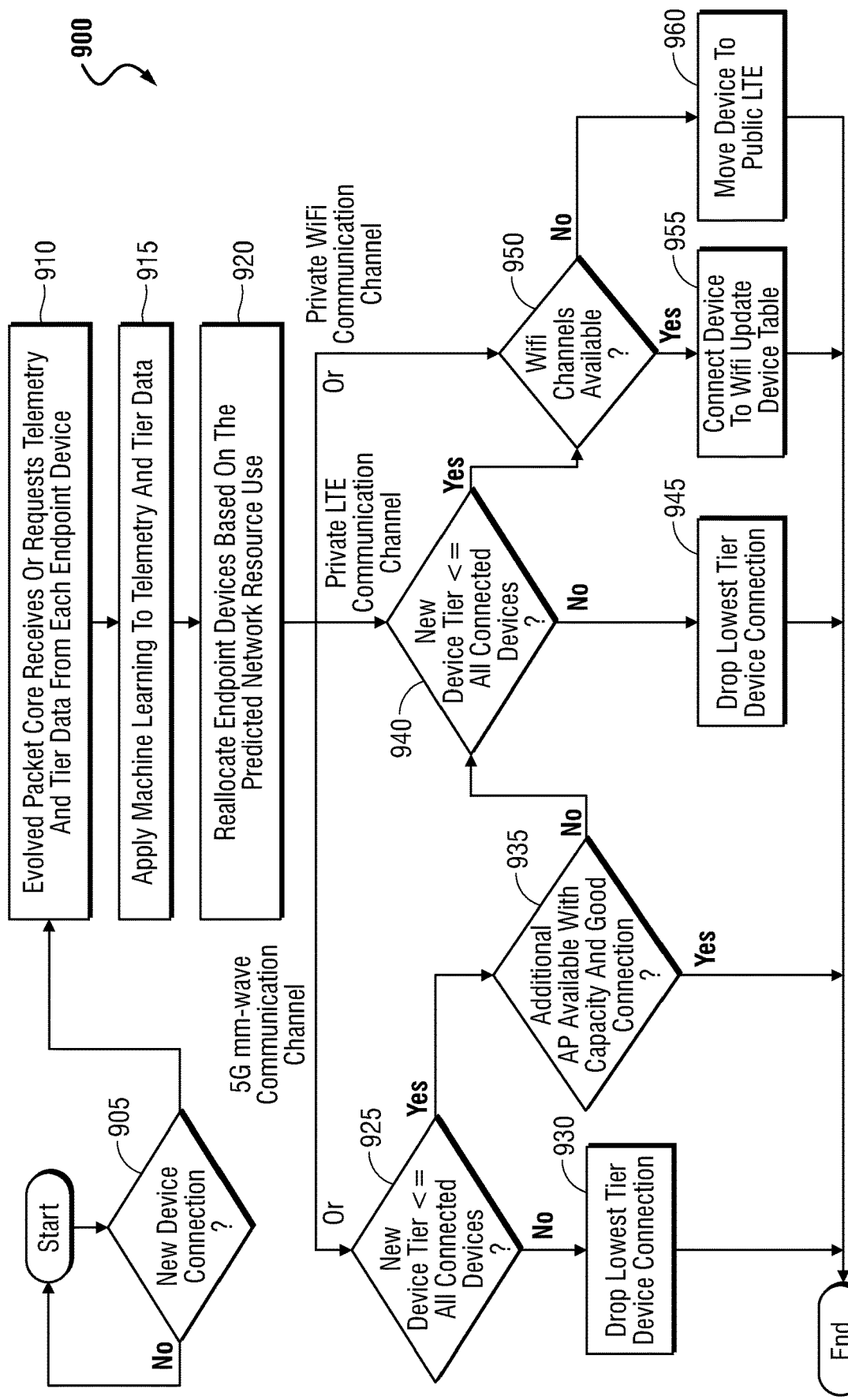
FIG. 9 is a flow diagram illustrating a method of intelligently managing data connections to a communication network according to an embodiment of the present disclosure.

FIG. 9 is a flow diagram illustrating a method 900 for intelligent management of data connections to a communication network according to an embodiment of the present disclosure. The method 900 may include, at block 905, with the detection of a new device at, for example, an evolved packet core associated with a communication network. As described herein, the evolved packet core may be any device or devices that execute instructions, parameter, and profiles so that voice and data communication requests from endpoint devices may be received and routed to a communication network as described herein. During this detection of the new device at block 905, the evolved packet core may receive or request data from the endpoint device at block 910. This data includes, at least, a designated tier that the endpoint device is assigned. In other embodiments, the data requested may include the telemetry data that includes endpoint device historic use data, data descriptive of a current communication channel each of the endpoint devices are communicatively coupled to, data descriptive of current or anticipated data traffic sent over the communication network by each of the endpoint devices, and applications that have and will be executed at the endpoint device, among other telemetry data as described herein. At 910, the evolved packet core may determine a network tier to be assigned to each of the endpoint devices. At 910, the evolved packet core may also send on requested data and various communication requests described herein for example in connection with FIG. 4. The tier of the endpoint device defines the level of access the endpoint device is allowed to the communication networks. As described herein, a top-tiered endpoint device may be designated as being part of a particular network slice using a high throughput, low-latency, high-bandwidth communication network such as a 5G mm-wave communication network. The method may include at block 915 determining a predicted recommendation for each of the endpoint devices based on the machine learning network prediction model developed using the received telemetry data from the plurality of endpoint devices and the networked access points.

The method 900 may continue, at block 915, with applying the communication network machine learning algorithm to the telemetry data received from each endpoint device as described herein. In an embodiment, a communication network machine learning management module may be responsible for receiving the telemetry data from the telemetry data module and passing that telemetry data through that communication network machine learning algorithm. By passing the telemetry data through the communication network machine learning algorithm, a network prediction model may be generated that describes how much data is and will be transmitted across any given access point and communication channel within the communication network. As described herein, the network prediction model generated by the execution of the communication network machine learning algorithm may also provide data descriptive of how to communicatively couple each of the endpoint devices to which of the plurality of communication channels within the communication network. These communication channels may include a private LTE 5G NR communication network, a public LTE 5G NR communication network, a private LTE 4G communication network, a public LTE 4G communication network, a public WiFi communication network, a private WiFi communication network, or any other citizen broadband radio service (CBRS) communication network. In an embodiment, the communication network machine learning management module determines a predicted recommendation for the endpoint devices based on the machine learning network prediction model developed during the receipt of the telemetry data from a plurality of endpoint devices, the access points associated with any communication network, and metadata from a specific endpoint device.

The method 900 may continue with reallocating endpoint devices based on the predicted network resource use of the each endpoint devices. The reallocation may be to a specific communication channel, to a specific access point, or both. A communication channel may refer to, as described herein, a radio frequency channel that may form part of one of the a private LTE communication network, a public WiFi communication network, a private WiFi communication network, a 4G LTE public communication network, or a 5G millimeter-wave (mm-wave) communication network, among other types of public and private communication networks. The method 900 may include communicatively coupling the endpoint devices to one of these types of communication channels on the communication network and may direct any of the endpoint devices to one of these communication channels based on the network prediction model created via the application of the machine learning algorithm to the telemetry data at block 915.

In some embodiments, the method 900 may include altering the communication channel further based on the tier assigned to the endpoint device. At any time, as the telemetry data changes, however, the processes described in connection with blocks 905 through 920 may be initiated.

The method 900 may continue at block 925 with determining whether the tier associated with the endpoint device is less than or equal to any of the endpoint devices communicatively coupled to any of the communication networks, and in a specific embodiment, a 5G mm-wave communication channel. In this embodiment, a 5G mm-wave communication channel may be preferential over any other types of communication network such as a WiFi communication network or an LTE communication network. The reallocation of the endpoint devices at block 920 may cause some of the endpoint devices to be communicatively coupled to this 5G mm-wave communication network. Additionally, any endpoint device currently communicatively coupled to the 5G mm-wave communication channel whose tier assigned to it is lower than that assigned to any newly connected endpoint device may be dropped from the 5G mm-wave communication network at block 930. At this point, the process may end.

Where it is determined that the tier associated with the new endpoint device is lower than or equal to any of the devices communicatively coupled to the 5G mm-wave communication channel (YES determination at block 925), the method 900 may continue with reallocating the endpoint device to another access point within the 5G mm-wave communication channel at block 935. In this embodiment, the tier of the endpoint device may determine whether the endpoint device is able to be communicatively coupled to the endpoint device. The method 900 may end here.

Where it is determined that no additional access point is available with capacity and that has a good connection such as a good signal strength (NO determination at block 935), the method 900 may continue with moving the endpoint device to a private LTE communication network at block 950. In some embodiments, during the reallocation of the endpoint devices, the evolved packet core described herein may direct one or more of the endpoint devices to be communicatively coupled to this private LTE at decision block 940 and a decision may be made again as to whether the tier assigned to the new endpoint device by the application of the machine learning algorithm is lower than or equal to any other endpoint device communicatively coupled to the private LTE communication network.

Where it is determined that the tier associated with the new endpoint device is higher than any of the devices communicatively coupled to any of the communication networks (NO determination at block 940), the method 900 may continue with dropping an endpoint device having the lowest or a lower tier from a communication network so that the new endpoint device may be communicatively coupled to the communication network at block 945. The method 900 may end here.

Where it is determined that the tier associated with the new endpoint device is less than or equal to any of the devices communicatively coupled to any of the communication networks (YES determination at block 940), the method 900 may continue with determining whether a private WiFi channel is available on the communication network at block 950. Again, in some embodiments, during the reallocation of the endpoint devices, the evolved packet core described herein may direct one or more of the endpoint devices to be communicatively coupled to this WiFi communication channel at decision block 950 and a decision may be made again as to whether the tier assigned to the new endpoint device by the application of the machine learning algorithm is lower than or equal to any other endpoint device communicatively coupled to the private LTE communication network.

Where a private WiFi channel is available (YES determination at block 950), the endpoint device may be communicatively coupled to the private WiFi communication network at block 955. The method 900 may end here. Where it is determined that the tier associated with the endpoint device is not less than or equal to any of the devices communicatively coupled to any of the communication networks (NO determination at block 950), the method 900 may continue with moving the endpoint device to a public LTE communication network at block 960 thereby allowing the endpoint device to rely on resources that are not part of any private network. The method 900 may end here.

Along with using an assigned tier associate with any given endpoint device, the process described above also uses the telemetry data and communication network machine learning algorithm described herein to also determine which of a plurality of access points and communication channels for any endpoint device to be communicatively coupled to. As described, the telemetry data module may detect whether the telemetry data at any endpoint device has changed and, where it has, the process may continue over with the endpoint device being assigned, potentially, to a new access point and/or communication network based on those changes and per the network prediction model generated by the communication network machine learning algorithm described herein. In an embodiment, an AP management module, a management engine, and/or a reallocation module may each set priorities related to network optimization in order to assign and reallocate these endpoint devices among the communication channels and access points at any time as the telemetry data associated with each endpoint device changes.

Figure 10:
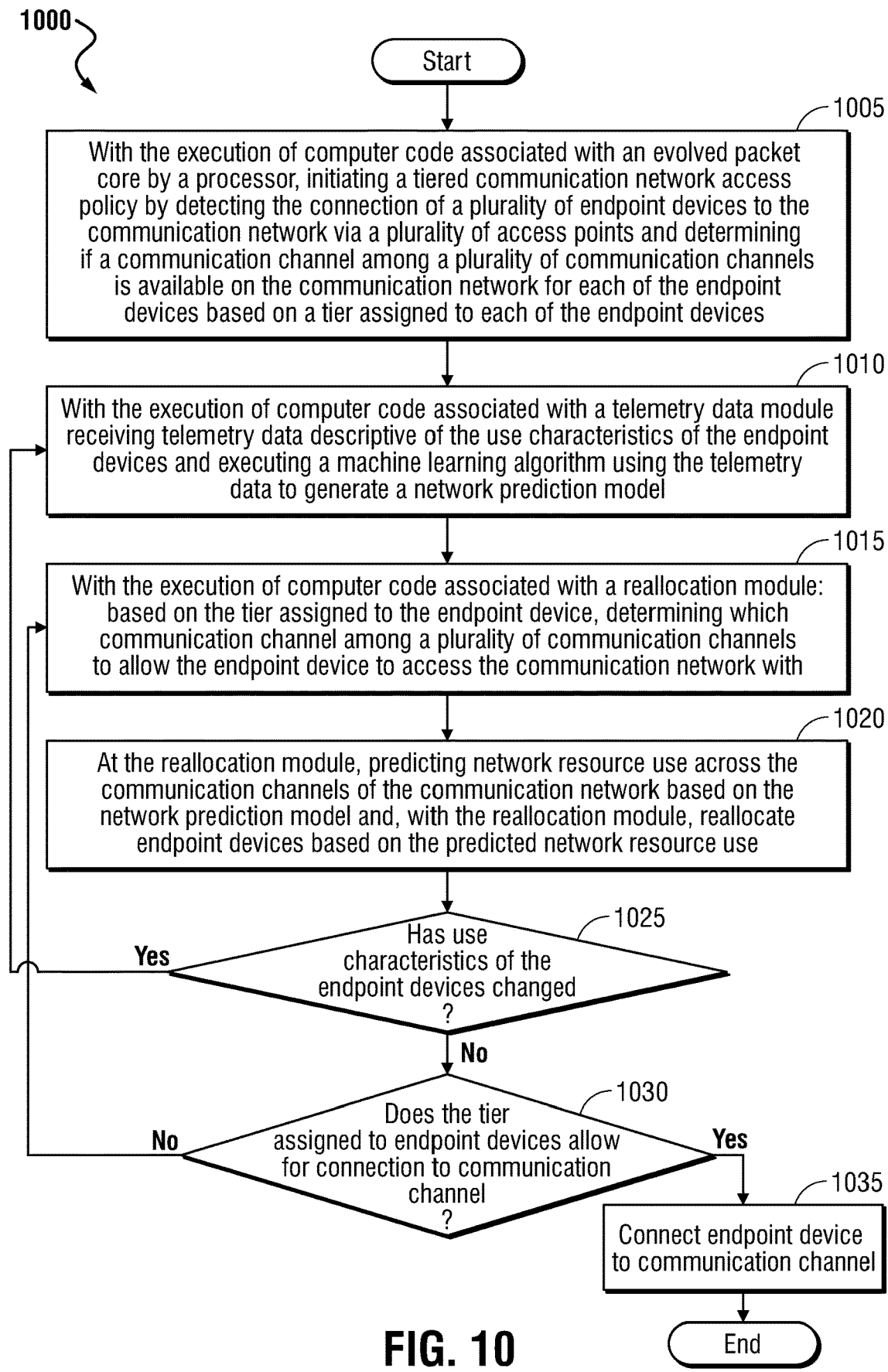
FIG. 10 is a flow diagram illustrating a method of intelligently managing data connections to a communication network according to another embodiment of the present disclosure.

FIG. 10 is a flow diagram illustrating a method 1000 of intelligent management of data connections to a communication network according to an embodiment of the present disclosure. The method 1000 may begin, at block 1005, with initiating a tiered communication network access policy by detecting the connection of a plurality of endpoint devices to the communication network via a plurality of access points and determining if a communication channel among a plurality of communication channels is available on the communication network for each of the endpoint devices based on a tier assigned to each of the endpoint devices. This process may be conducted via the execution of computer code associated with an evolved packet core by a processor of the information handling system described herein. These types of connections detected at block 1005 may include those communication channels found in a private LTE communication network, a public WiFi communication network, a private WiFi communication network, a 4G LTE public communication network, or a 5G millimeter-wave (mm-wave) communication network, among other types of public and private communication networks.

The method 1000 may further include receiving telemetry data descriptive of the use characteristics of the endpoint devices and executing a machine learning algorithm using the telemetry data to generate a network prediction model at block 1010. This receipt of the telemetry data may be completed upon execution of computer code associated with a telemetry data module. In any embodiment, the telemetry data may be descriptive of the use characteristics of any of the endpoint devices. These use characteristics may include a current communication channel each of the endpoint devices are communicatively coupled to as well as data descriptive of current or anticipated data traffic sent over the communication network by each of the endpoint devices.

The method 1000 at block 1010 may further include executing a machine learning algorithm using the telemetry data to generate a network prediction model. The communication network machine learning algorithm described herein, for example, may be a computer executable program code that generates a network prediction model that describes how much data is and will be transmitted across any given access point and communication channel. The network prediction model generated by the execution of the communication network machine learning algorithm may also provide data descriptive of how to communicatively couple each endpoint devices to which of the plurality of communication channels within the communication network.

At block 1010, a communication network machine learning management module may utilize the telemetry data and a resulting network prediction model created by the execution of the communication network machine learning algorithm as a baseline for use with any currently received telemetry data from any endpoint device. The telemetry data may include data descriptive of current or anticipated data traffic sent over the communication network by each of the endpoint devices, a tier assigned to each endpoint device, a current communication channel each of the endpoint devices are communicatively coupled to, and applications to be executed on each endpoint device, among other use characteristics of the endpoint devices. In order to model the relationships between each of these inputs, a neural network may be used as the communication network machine learning algorithm such that an input layer to this neural network may include a known, recorded set of values for each of these parameters from the received telemetry data from an adopted, previously defined predictive time and date for the plurality of end user devices and the plurality of communications networks available being accessed by these end user devices. An output layer to the neural network may include a projected optimal set of values for each of the endpoint devices for a currently-updated, predictive time and date-based network prediction module. As the identified telemetry data sets are merged via the communication network machine learning algorithm of the communication network machine learning management module, the accuracy of the multi-factor categorization becomes more accurate and potentially more specific. Training of a machine learning model for one or more predictive telemetry data sets may be conducted via multiple iterations of the communication network machine learning algorithm until a pattern is found in the current time and date, or additional factors, of potential predictive time periods of wireless utilization by the endpoint devices and available networks from which inputs are utilized. In some aspects, the communication network machine learning algorithm may be a supervised machine learning algorithm that may be utilized to predict desired outcome of wireless communication network use or predict that one or more access points will see an increase in bandwidth use or not. The supervised machine learning algorithm may initially operate within a training period, and upon hitting a level of accuracy then be implemented to provide predictive communication network use as a network prediction model. Other examples of communication network machine learning algorithms may be utilized as well including use of artificial neural networks, Bayesian networks, decision trees, regression analysis, among others that may be used to create the network prediction model.

The method 1000 may continue, at block 1015, where the execution of computer code associated with a reallocation module, based on the tier assigned to the endpoint device, determining which communication channel among a plurality of communication channels to allow the endpoint device to access the one or more communication networks. Additionally, at block 1020, the method 1000 may continue with, at the reallocation module, predicting network resource use across the communication channels of the communication network based on the network prediction model and, with the reallocation module, reallocate endpoint devices based on the predicted network resource use.

The method 1000, may also include determining, at block 1025, whether the use characteristics of any of the endpoint devices has changed. In the examples where the use characteristics of any given endpoint device has changed (YES determination at block 1025), the method 1000 may continue back at block 1010 for adjustment to the network prediction model via adjustment of inputs to the executed machine learning algorithm applied there via the communication network machine learning management module. The method may then proceed again to block 1015 with, at the reallocation module and based on the tier assigned to the endpoint device, determining which communication channel among a plurality of communication channels to allow the endpoint device to access the one or more communication networks.

In the examples where the use characteristics of any of the endpoint devices has not changed (NO determination at block 1025), the method 1000 may continue with determining, at block 1030, whether the tier assigned to the information handling system allows for the communicative coupling to a current communication channel or another. Where the tier assigned to any given access point does not allow for the communicative coupling to the current communication channel (NO determination, block 1030), the method 1000 may proceed, at block 1010, with the reallocation module determining, based on the tier assigned to the endpoint device, which communication channel among a plurality of communication channels to allow the endpoint device to access. A denial of a recommended tier of the network prediction model is also provided back to block 1010 (not shown) for modification of the network prediction model via adjustment of inputs to the executed machine learning algorithm applied there via the communication network machine learning management module to account for ongoing network traffic conditions as detected via the reallocation module as adjusted inputs. Where the tier assigned to the information handling system does allow for the communicative coupling to the current communication channel (YES determination, block 1030), the method 1000 may connect to the communication channel.

At this point, the method 1000 may end however iterative or continuous adjustments may be made depending on new device being added to or removed from the intelligently managed communication networks such as at block 1005. The systems herein may be continuously monitoring changes to the network and modifying the network prediction model depending on changes detected to endpoint devices or availability within the communication networks.

The blocks of the flow diagrams of FIGS. 9 and 10 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   the processor to execute computer code of an evolved packet core to initiate a tiered communication network access policy configured to:
      detect the connection of each of a plurality of endpoint devices to a communication network via one of a plurality of access points; and
      determine if a communication channel among a plurality of communication channels is available on the communication network for each of the endpoint devices based on a tier assigned to each of the plurality of endpoint devices;
   the processor to execute computer code of a telemetry data module configured to:
      receive telemetry data descriptive of the use characteristics of the endpoint devices; and
      execute a communication network machine learning algorithm using the received telemetry data to generate a network prediction model; and
   the processor to execute computer code of a reallocation module configured to:
      predict network resource use across the communication channels of the communication network based on the network prediction model; and
      reallocate each of the plurality of endpoint devices among a plurality of access points based on the predicted network resource use and tier assigned to the plurality of endpoint devices.

2. The information handling system of claim 1, wherein the reallocation module comprises an access point management module configured to:
   receive the predicted network resource use that comprises a description of a predicted use of a plurality of access points associated with the communication network; and
   reallocate endpoint devices among the plurality of access points based on the predicted use of the plurality of access points associated with the communication network.

3. The information handling system of claim 1, wherein the reallocation module receives anticipated communication network traffic descriptive of an increase in internet-of-things traffic across the communication network and, reallocates endpoint devices among the plurality of access points based on the tier assigned to the plurality of endpoint devices and the anticipated use characteristics of the information handling system.

4. The information handling system of claim 1, wherein the predicted network resource use comprises data descriptive of time of day, operating hours of each of the endpoint devices, and historic data of the execution of applications on each of the endpoint devices.

5. The information handling system of claim 1, wherein the telemetry data descriptive of the use characteristics of the endpoint devices comprises calendar data indicating a teleconference is to be initiated by a first of the plurality of endpoint devices and reallocating endpoint devices among the plurality of access points based on an increase of data traffic during the teleconference.

6. The information handling system of claim 1, wherein the telemetry data comprises data descriptive of data traffic sent over the communication network by some portion of the endpoint devices as reported in the received telemetry data.

7. The information handling system of claim 1, wherein the telemetry data is descriptive of the use characteristics of the endpoint devices comprises calendar data indicating a teleconference is to be initiated by a first of the plurality of endpoint devices.

8. The information handling system of claim 1, wherein the telemetry data descriptive of the use characteristics of the endpoint devices comprises data descriptive of which applications are being executed by a first of the plurality of endpoint devices.

9. The information handling system of claim 1, wherein the telemetry data descriptive of the use characteristics of the endpoint devices comprises data descriptive of historic communication network traffic passed from a first of the plurality of endpoint devices over the communication network.

10. A method of managing data connections to a communication network; comprising:
    with the execution of computer code associated with an evolved packet core by a processor, initiating a tiered communication network access policy by:
       detecting the connection of each of a plurality of endpoint devices to a communication network via one of a plurality of access points; and
       determining if a communication channel among a plurality of communication channels is available on the communication network for each of the endpoint devices based on a tier assigned to each of the endpoint devices;

with the execution of computer code associated with a telemetry data module:
receiving telemetry data descriptive of the use characteristics of the endpoint devices; and
executing a machine learning algorithm using the telemetry data to generate a network prediction model; and
with the execution of computer code associated with a reallocation module:
based on the tier assigned to the endpoint device, determining which communication channel among a plurality of communication channels to allow the endpoint device to access the communication network with; and
predicting network resource use across the communication channels of the communication network based on the network prediction model and, with the reallocation module, reallocate endpoint devices among a plurality of access points based on the predicted network resource use- and tier assigned to the plurality of endpoint devices.

11. The method of claim 10, further comprising, with the execution of computer code associated with an access point management module:
receiving the predicted network resource use that comprises a description of a predicted use of a plurality of access points associated with the communication network; and
reallocating some portion of the plurality of endpoint devices among the plurality of access points based on the predicted use of the plurality of access points associated with the communication network.

12. The method of claim 10, further comprising receiving anticipated communication network traffic at the reallocation module descriptive of an increase in internet-of-things traffic across the communication network and reallocating endpoint devices among the plurality of access points based on the tier assigned to the plurality of endpoint devices and the anticipated use characteristics of the endpoint devices in view of the increase of internet-of-things traffic.

13. The method of claim 10, wherein the predicted network resource use comprises data descriptive of time of day, operating hours of each of the endpoint devices, and historic data of the execution of applications on a plurality of the endpoint devices.

14. The method of claim 10, wherein the telemetry data descriptive of the use characteristics of the endpoint devices comprises calendar data indicating a teleconference is to be initiated by a first of the plurality of endpoint devices and reallocating endpoint devices among the plurality of access points based on an increase of data traffic during the teleconference.

15. The method of claim 10, wherein telemetry data comprises data descriptive of a communication channel each of the endpoint devices are communicatively coupled to as reported in the received telemetry data.

16. The method of claim 10, wherein the telemetry data descriptive of the use characteristics of the endpoint devices comprises data descriptive of historic communication network traffic passed from a first of the plurality of endpoint devices over the communication network.

17. A communication network backend server, comprising:
a processor;
a memory;
a telemetry data module including computer code executed by the processor to maintain a telemetry database and to receive telemetry data from a plurality of endpoint devices communicatively coupled to the communication network backend server via a communication network, the telemetry data including data descriptive of the use characteristics of each of the plurality of endpoint devices;
an evolved packet core including computer code executed by the processor to initiate a tiered communication network access policy configured to:
detect the connection of each of a plurality of endpoint devices to a communication network via a first access point of a plurality of access points; and
determine if a communication channel among a plurality of communication channels is available on the communication network for each of the endpoint devices based on a tier assigned to each of the endpoint devices;
a machine learning module including computer code executed by the processor configured to:
receive the telemetry data; and
execute a machine learning algorithm using the telemetry data to generate a network prediction model;
an access point management module including computer code executed by the processor configured to:
receive metadata from a first endpoint device among the plurality of endpoint devices, the metadata comprising use characteristics of the first endpoint device among the plurality of endpoint devices;
pass the metadata through an access point prediction module including computer code executed by the processor to develop an access point prediction; and
reallocate the first endpoint device to a second access point among the plurality of access points based on the prediction from the access point prediction module and tier assigned to the first endpoint device.

18. The communication network backend server of claim 17, further comprising an access point communications module including computer code executed by the processor to balance network traffic among the plurality of access points based on the network prediction model.

19. The communication network backend server of claim 17, wherein telemetry data comprises data descriptive of a communication channel each of the plurality of endpoint devices are communicatively coupled to as reported in the received telemetry data.

20. The communication network backend server of claim 17, wherein the telemetry data descriptive of the use characteristics of the endpoint devices comprises data descriptive of which applications are being executed by the first endpoint device of the plurality of endpoint devices.

* * * * *